United States Patent
Parvulescu et al.

(10) Patent No.: US 11,219,886 B2
(45) Date of Patent: Jan. 11, 2022

(54) RARE EARTH ELEMENT CONTAINING ALUMINUM-RICH ZEOLITIC MATERIAL

(71) Applicant: BASF SE, Ludwigshafen am Rhein (DE)

(72) Inventors: Andrei-Nicolae Parvulescu, Ludwigshafen (DE); Robert McGuire, Florham Park, NJ (US); Ulrich Mueller, Ludwigshafen (DE); Weiping Zhang, Dalian (CN); Xiangju Meng, Hangzhou (CN); Feng-Shou Xiao, Hangzhou (CN); Toshiyuki Yokoi, Tokyo (JP); Hermann Gies, Bochum (DE); Bernd Marler, Bochum (DE); Ute Kolb, Mainz (DE); Dirk De Vos, Leuven (BE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 17/047,239

(22) PCT Filed: May 23, 2019

(86) PCT No.: PCT/CN2019/088123
§ 371 (c)(1),
(2) Date: Oct. 13, 2020

(87) PCT Pub. No.: WO2019/223761
PCT Pub. Date: Nov. 28, 2019

(65) Prior Publication Data
US 2021/0162385 A1  Jun. 3, 2021

(51) Int. Cl.
*B01D 53/94* (2006.01)
*B01J 29/70* (2006.01)
(Continued)

(52) U.S. Cl.
CPC .......... *B01J 29/76* (2013.01); *B01D 53/9418* (2013.01); *B01J 29/7049* (2013.01);
(Continued)

(58) Field of Classification Search
CPC .......... B01D 53/9418; B01D 2255/206; B01D 2255/2065; B01D 2255/20761;
(Continued)

(56) References Cited

U.S. PATENT DOCUMENTS

| 2015/0258537 A1 | 9/2015 | Morohoshi et al. |
| 2018/0072579 A1 | 3/2018 | Petrovic et al. |
| 2019/0022584 A1 | 1/2019 | Hilgendorff et al. |

FOREIGN PATENT DOCUMENTS

| CN | 1270852 A | * 10/2000 |
| CN | 106660021 A | 5/2017 |

(Continued)

OTHER PUBLICATIONS

Martin et al, "Efficient synthesis of the Cu—SSZ-39 catalyst for DeNOx applications†" Chem. Commun., 2015, 51, 11030 (Year: 2015).*

(Continued)

*Primary Examiner* — David M Brunsman
(74) *Attorney, Agent, or Firm* — Finnegan, Henderson, Farabow, Garrett & Dunner LLP

(57) ABSTRACT

The present invention relates to a rare earth element containing zeolitic material having a framework structure selected from the group consisting of AEI, AFT, AFV, AFX, AVL, CHA, EMT, GME, KFI, LEV, LTN, and SFW, including mixtures of two or more thereof, the framework structure of the zeolitic material comprising $SiO_2$ and $X_2O_3$, wherein X stands for a trivalent element, wherein the zeolitic material displays an $SiO_2:X_2O$ molar ratio in the range of from 2 to 20, and wherein the zeolitic material contains one or (Continued)

more rare earth elements as counter-ions at the ion exchange sites of the framework structure. Furthermore, the present invention relates to a process for the production of the inventive rare earth element containing zeolitic material as well as to the use of the inventive rare earth element containing zeolitic material.

14 Claims, 6 Drawing Sheets

(51) Int. Cl.
    *B01J 29/72*     (2006.01)
    *B01J 29/76*     (2006.01)
    *B01J 37/00*     (2006.01)
    *B01J 37/06*     (2006.01)
    *B01J 37/08*     (2006.01)
    *B01J 37/30*     (2006.01)
    *B01J 29/80*     (2006.01)
    *B01J 29/06*     (2006.01)

(52) U.S. Cl.
    CPC ....... *B01J 29/7065* (2013.01); *B01J 29/7069* (2013.01); *B01J 29/72* (2013.01); *B01J 29/723* (2013.01); *B01J 29/7238* (2013.01); *B01J 29/7638* (2013.01); *B01J 37/009* (2013.01); *B01J 37/06* (2013.01); *B01J 37/08* (2013.01); *B01J 37/30* (2013.01); *B01D 2255/2061* (2013.01); *B01D 2255/20761* (2013.01); *B01D 2255/50* (2013.01); *B01J 29/80* (2013.01); *B01J 2029/062* (2013.01)

(58) Field of Classification Search
    CPC .............. B01D 2255/50; B01J 29/7049; B01J 29/7065; B01J 29/72; B01J 29/723; B01J 29/74; B01J 29/743; B01J 29/76; B01J 29/763; B01J 2229/186; B01J 37/30; B01J 29/7238; B01J 29/7638; B01J 29/7069; C01B 39/026
See application file for complete search history.

(56) References Cited

FOREIGN PATENT DOCUMENTS

| | | | |
|---|---|---|---|
| CN | 107406264 A | | 11/2017 |
| WO | WO 2013/068976 A1 | | 5/2013 |
| WO | WO 2015/195819 | * | 12/2015 |
| WO | WO 2017/037006 A1 | | 3/2017 |
| WO | WO-2017201812 A1 | * | 11/2017 ............. G01F 1/002 |

OTHER PUBLICATIONS

Zhao, Z. et al., "Cu-exchanged Al-rich SSZ-13 Zeolite From Organotemplate-free Synthesis as $NH_3$—SCR Catalyst: Effects of $Na^+$ Ions on the Activity and Hydrothermal Stability", Appl. Catal. B: Environ. 2017, 217, 421-428.
Iwasaki, M. et al., "Hydrothermal Stability Enhancement by Sequential ion-exchange of Rare Earth Metals on Fe/BEA Zeolites Used as NO Reduction Catalysts", Chem. Commun. 2011, 47, 3966-3968.
Wang, J. et al., "Cerium-Stabilized Cu—SSZ-13 Catalyst for the Catalytic Removal of $NO_x$ by $NH_3$", Ind. Eng. Chem. Res. 2016, 55, 1174-1182.
Shu, Y. et al., "Effect of Ionic Radius of Rare Earth on USY Zeolite in Fluid Catalytic Cracking: Fundamentals and Commercial Application", Top Catal 2015, 58, 334-342.
International Search Report dated Aug. 19, 2019 in PCT/CN2019/088123 filed on May 23, 2019.

* cited by examiner

RARE EARTH ELEMENT CONTAINING ALUMINUM-RICH ZEOLITIC MATERIAL

This application is a 371 filing of PCT/CN2019/088123, filed May 23, 2019.

TECHNICAL FIELD

The present invention relates to a rare earth element containing zeolitic material having a framework structure selected from the group consisting of AEI, AFT, AFV, AFX, AVL, CHA, EMT, GME, KFI, LEV, LTN, and SFW, including mixtures of two or more thereof, the framework structure of the zeolitic material comprising $SiO_2$ and $X_2O_3$, wherein X stands for a trivalent element, wherein the zeolitic material displays an $SiO_2:X_2O_3$ molar ratio in the range of from 2 to 20, and wherein the zeolitic material contains one or more rare earth elements as counter-ions at the ion exchange sites of the framework structure. Furthermore, the present invention relates to a process for the production of the inventive rare earth element containing zeolitic material as well as to the use of the inventive rare earth element containing zeolitic material as such and as obtainable and/or obtained according to the inventive process.

INTRODUCTION $NH_3$-SCR is the most effective technique for NOx abatement in lean-burning engine exhaust after-treatment. In this regard, Cu-SSZ-13 has been commercialized as $NH_3$-SCR catalyst for its significant advantages of excellent catalytic performance and hydrothermal stability. However, with more and more stringent restriction on engine exhaust, especially for vehicles under cold start conditions, further enhancing the low-temperature $NH_3$-SCR activity and hydrothermal stability of SCR catalysts is highly desirable.

Zhao, Z. et al., *Appl. Catal. B: Environ.* 2017, 217, 421-428 relates to the enhancement of the low-temperature activity as well as the hydrothermal stability of Cu exchanged Al-rich SSZ-13 zeolite using sodium. Wang, J. et al., *Ind Eng. Chem. Res.* 2016, 55, 1174-1182 concerns cerium-stabilized Cu-SSZ-13 and its use as a catalyst in SCR. Iwasaki, M. et al., *Chem. Commun.* 2011, 47, 3966-3968 relates to the use of rare-earth ions with diameters of 1.05 to 1.15 angstroms for improving the hydrothermal stability of Fe-Beta zeolite and its use in SCR.

Shu, Y. et al., *Top Catal* 2015, 58, 334-342, on the other hand, concerns the use of rare-earth ions to enhance the hydrothermal stability of Y zeolites used as FCC catalysts.

Among SSZ-13 zeolites with similar Cu loadings, Al-rich SSZ-13, i.e. SSZ-13 displaying low molar ratios of silica to alumina, tends to show higher activity in SCR. Elevating Al content in SSZ-13 zeolite may therefore be a promising method to enhance both the low- and high-temperature activity. However, the major problem of Al-rich SSZ-13 zeolite is that due to its high aluminum content, it has low hydrothermal stability, and the low-temperature activity is significantly degraded after deep hydrothermal aging. Consequently, the relatively low hydrothermal stability of Al-rich Cu-SSZ-13 catalysts hinders their practical application for $NH_3$-SCR reaction.

DETAILED DESCRIPTION

It was therefore the object of the present invention to provide an improved zeolitic material having a low silica to alumina molar ratio, in particular with regard to its hydrothermal stability and catalytic properties. Furthermore, it was an object of the present invention to provide an improved catalyst, in particular for use in the selective catalytic reduction (SCR) of $NO_R$. Said objects are achieved by the rare earth element containing zeolitic materials according to the present invention, as well as by the inventive method for their production and by their use as a catalyst, in particular in SCR. Thus, it has surprisingly been found that for the inventive catalysts a superior NO conversion in SCR may be observed at low temperatures compared to a catalyst sample devoid of a rare earth metal. Furthermore, it has quite unexpectedly been found that for preferred inventive catalysts containing rare earth elements having a low effective ionic radius such as yttrium, a superior NO conversion is observed in the aged catalysts at high temperatures comparted to a catalyst devoid of a rare earth metal when yttrium is used in certain loadings. In this regard, it has surprisingly been found that the aforementioned unexpected technical effects may be achieved in particular in zeolites having a framework type structure with double 6 membered rings in their structure, wherein zeolites having a framework structure selected from the group consisting of AEI, AFT, AFV, AFX, AVL, CHA, EMT, GME, KFI, LEV, LTN, and SFW may be specifically named in this regard.

Thus, the present invention relates to a rare earth element containing zeolitic material having a framework structure selected from the group consisting of AEI, AFT, AFV, AFX, AVL, CHA, EMT, GME, KFI, LEV, LTN, and SFW, including mixtures of two or more thereof, the framework structure of the zeolitic material comprising $SiO_2$ and $X_2O_3$, wherein X stands for a trivalent element, wherein the zeolitic material displays an $SiO_2:X_2O_3$ molar ratio in the range of from 2 to 20, and wherein the zeolitic material contains one or more rare earth elements as counter-ions at the ion exchange sites of the framework structure.

As regards the framework structure of the zeolitic material, no particular restriction applies provided that the zeolitic material has a framework structure selected from the group consisting of AEI, AFT, AFV, AFX, AVL, CHA, EMT, GME, KFI, LEV, LTN, and SFW, including mixtures of two or more thereof. Preferably, the framework structure of the zeolitic material is selected from the group consisting of AEI, CHA, GME, LEV, and LTN, including mixtures of two or more thereof. More preferably, the framework structure of the zeolitic material is selected from the group consisting of AEI, CHA, and GME, including mixtures of two or more thereof. It is particularly preferred that the zeolitic material has a CHA or AEI-type framework structure.

As regards the $SiO_2:X_2O_3$ molar ratio, no particular restriction applies provided that the $SiO_2:X_2O_3$ molar ratio is in the range of from 2 to 20. Preferably, the $SiO_2:X_2O_3$ molar ratio is in the range of from 3 to 16, more preferably of from 4 to 14, more preferably of from 5 to 12, more preferably of from 6 to 10, more preferably of from 7 to 9, and more preferably of from 7.5 to 8. As regards the element X, no particular restriction applies. Preferably, the element X is selected from the group consisting of Al, B, In, Ga, and combinations of two or more thereof. More preferably, the element X is selected from the group consisting of Al, Ga, and combinations thereof. It is particularly preferred that the element X is Al.

Therefore, it is particularly preferred that the framework structure of the zeolitic material has a CHA or AEI-type framework structure, that the $SiO_2:X_2O_3$ molar ratio is in the range of from 7 to 9, preferably of from 7.5 to 8, and that the element X is selected from the group consisting of Al, Ga, and combinations thereof, preferably the element X being Al.

As regards the one or more rare earth elements contained as counter-ions at the ion exchange sites of the framework structure of the zeolitic material, no particular restriction applies. Each of the one or more rare earth elements contained as counter-ions at the ion exchange sites of the framework structure of the zeolitic material has a specific effective radius, whereby said effective radius as disclosed herein refers to the effective (ionic) radius determined as described in Jia, Y. Q., "Crystal Radii and Effective Ionic Radii of the Rare Earth Ions", *J. Solid State Chem.* 1991, 95: 184-187, wherein the ionic radius is the effective (ionic) radius for the coordination number N=6. As regards the effective radius of the one or more rare earth elements contained as counter-ions at the ion exchange sites of the framework structure of the zeolitic material, no particular restriction applies. Preferably, the effective ionic radius of the one or more rare earth elements contained as counter-ions at the ion exchange sites of the framework structure of the zeolitic material is 1.3 angstroms (1 angstrom is equal to $10^{-10}$ meter) or less, more preferably 1.25 angstroms or less, more preferably 1.2 angstroms or less, more preferably 1.15 angstroms or less, more preferably 1.1 angstroms or less, more preferably 1.05 angstroms or less, more preferably 1.0 angstroms or less, more preferably 0.95 angstroms or less, more preferably 0.9 angstroms or less, and more preferably 0.88 angstroms or less.

As disclosed above, no particular restriction applies as regards the one or more rare earth elements. Preferably, the one or more rare earth elements are selected from the group consisting of La, Ce, Pr, Nd, Sm, Eu, Gd, Tb, Dy, Ho, Er, Tm, Yb, Lu, Y, and Sc, including combinations of two or more thereof, more preferably from the group consisting of Pr, Nd, Sm, Eu, Gd, Tb, Dy, Ho, Er, Tm, Yb, Lu, Y, and Sc, including combinations of two or more thereof, more preferably from the group consisting of Sm, Eu, Gd, Tb, Dy, Ho, Er, Tm, Yb, Lu, Y, and Sc, including combinations of two or more thereof, more preferably from the group consisting of Yb, Lu, Y, and Sc, including combinations of two or more thereof. It is particularly preferred that the one or more rare earth elements are Y and/or Yb, preferably Y.

As regards the oxidation state of the one or more rare earth elements contained as counter-ions at the ion exchange sites, no particular restriction applies. Preferably, the one or more rare earth elements contained as counter-ions at the ion exchange sites are in the oxidation state +2 and/or +3, more preferably in the oxidation state +3.

Therefore, it is particularly preferred that the one or more rare earth elements are selected from the group consisting of Sm, Eu, Gd, Tb, Dy, Ho, Er, Tm, Yb, Lu, Y, and Sc, including combinations of two or more thereof, preferably from the group consisting of Yb, Lu, Y, and Sc, including combinations of two or more thereof, and more preferably the one or more rare earth elements are Y and/or Yb, preferably Y, and that the one or more rare earth elements contained as counter-ions at the ion exchange sites are in the oxidation state +3.

As regards the amount of the one or more rare earth elements which are contained in the zeolitic material, no particular restriction applies. Preferably, the one or more rare earth elements are contained in the zeolitic material in an amount in the range of from 0.1 to 7 wt.-% based on 100 wt.-% of $SiO_2$ contained in the zeolitic material, more preferably of 0.3 to 5 wt.-%, more preferably of 0.4 to 4 wt.-%, more preferably of 0.5 to 3.5 wt.-%, more preferably of 0.6 to 3 wt.-%, more preferably of 0.7 to 2.5 wt.-%, more preferably of 0.75 to 2 wt.-%, more preferably of 0.5 to 1.5 wt.-%, more preferably of 0.8 to 1.7 wt.-%, more preferably of 0.85 to 1.5 wt.-%, more preferably of 0.9 to 1.3 wt.-%, more preferably of 0.95 to 1.2 wt.-%, and more preferably of 1 to 1.1 wt.-%.

Therefore, it is particularly preferred that the one or more rare earth elements are selected from the group consisting of Sm, Eu, Gd, Tb, Dy, Ho, Er, Tm, Yb, Lu, Y, and Sc, including combinations of two or more thereof, preferably from the group consisting of Yb, Lu, Y, and Sc, including combinations of two or more thereof, and more preferably the one or more rare earth elements are Y and/or Yb, preferably Y, and that the one or more rare earth elements are contained in the zeolitic material in an amount in the range of from 0.1 to 7 wt.-% based on 100 wt.-% of $SiO_2$ contained in the zeolitic material, more preferably of 0.3 to 5 wt.-%, more preferably of 0.4 to 4 wt.-%, more preferably of 0.5 to 3.5 wt.-%, more preferably of 0.6 to 3 wt.-%, more preferably of 0.7 to 2.5 wt.-%, more preferably of 0.75 to 2 wt.-%, more preferably of 0.5 to 1.5 wt.-%, more preferably of 0.8 to 1.7 wt.-%, more preferably of 0.85 to 1.5 wt.-%, more preferably of 0.9 to 1.3 wt.-%, more preferably of 0.95 to 1.2 wt.-%, and more preferably of 1 to 1.1 wt.-%, and that the one or more rare earth elements contained as counter-ions at the ion exchange sites are in the oxidation state +3.

As regards the molar ratio $RE:X_2O_3$ of the one or more rare earth elements (RE) calculated as the element to $X_2O_3$ contained in the zeolitic material, no particular restriction applies. Preferably, the molar ratio $RE:X_2O_3$ of the one or more rare earth elements (RE) calculated as the element to $X_2O_3$ contained in the zeolitic material is in the range of from 0.01 to 0.3, more preferably of 0.02 to 0.22, more preferably of 0.03 to 0.17, more preferably of 0.035 to 0.13, more preferably of 0.03 to 0.1, more preferably of 0.035 to 0.08, more preferably of 0.04 to 0.06, more preferably of 0.043 to 0.05, and more preferably of 0.045 to 0.047.

Therefore, it is particularly preferred that the element X is selected from the group consisting of Al, B, In, Ga, and combinations of two or more thereof, more preferably the element X is selected from Al, Ga, and combinations thereof, more preferably the element X is Al, and that the one or more rare earth elements are selected from the group consisting of Sm, Eu, Gd, Tb, Dy, Ho, Er, Tm, Yb, Lu, Y, and Sc, including combinations of two or more thereof, preferably from the group consisting of Yb, Lu, Y, and Sc, including combinations of two or more thereof, and more preferably the one or more rare earth elements are Y and/or Yb, preferably Y, and that the molar ratio $RE:X_2O_3$ of the one or more rare earth elements (RE) calculated as the element to $X_2O_3$ contained in the zeolitic material is in the range of from 0.01 to 0.3, more preferably of 0.02 to 0.22, more preferably of 0.03 to 0.17, more preferably of 0.035 to 0.13, more preferably of 0.03 to 0.1, more preferably of 0.035 to 0.08, more preferably of 0.04 to 0.06, more preferably of 0.043 to 0.05, and more preferably of 0.045 to 0.047.

Further, the zeolitic material may contain one or more transition metal elements M as counter-ions at the ion exchange sites of the framework structure, wherein the transition metal elements M include the elements of the groups 3 to 12 of the periodic table of elements. Preferably, the zeolitic material contains one or more transition metal elements M as counter-ions at the ion exchange sites of the framework structure. More preferably, the one or more transition metal elements M are selected from the group consisting of Cr, Fe, Co, Ni, Cu, Zn, Pd, and Pt, including combinations of two or more thereof, as counter-ions at the ion exchange sites of the framework structure, wherein preferably the one or more transition metal elements are selected from the group consisting of Fe, Cu, Pd, and Pt, including combinations of two or more thereof, more preferably from the group consisting of Fe, Cu, and Pd, including combinations of two or more thereof, wherein more preferably the zeolitic material further contains Fe and/or Cu, preferably Cu.

In the case where one or more transition metal elements M are contained in the zeolitic material as counter-ions at the ion exchange sites of the framework structure, no particular restriction applies as regards the oxidation state thereof. Preferably, the one or more transition metal elements M contained as counter-ions at the ion exchange sites are in the oxidation state +2 and/or +3, preferably in the oxidation state +2.

In the case where one or more transition metal elements M are contained in the zeolitic material as counter-ions at the ion exchange sites of the framework structure, no particular restriction applies as regards the amount contained therein. Preferably, the one or more transition metal elements M are contained in the zeolitic material as counter-ions at the ion exchange sites of the framework structure in an amount in the range of from 0.5 to 10 wt.-% based on 100 wt.-% of $SiO_2$ contained in the zeolitic material, preferably of 1 to 7 wt.-%, more preferably of 1.5 to 5 wt.-%, more preferably of 2 to 4 wt.-%, more preferably of 2.3 to 3.5 wt.-%, more preferably of 2.5 to 3.2 wt.-%, more preferably of 2.6 to 3 wt.-%, and more preferably of 2.7 to 2.9 wt.-%.

Therefore, it is particularly preferred that one or more transition metal elements are contained in the zeolitic material as counter-ions at the ion exchange sites of the framework structure, and that the one or more transition metal elements M are selected from the group consisting of Cr, Fe, Co, Ni, Cu, Zn, Pd, and Pt, including combinations of two or more thereof, as counter-ions at the ion exchange sites of the framework structure, wherein preferably the one or more transition metal elements are selected from the group consisting of Fe, Cu, Pd, and Pt, including combinations of two or more thereof, more preferably from the group consisting of Fe, Cu, and Pd, including combinations of two or more thereof, wherein more preferably the zeolitic material further contains Fe and/or Cu, preferably Cu, and that the one or more transition metal elements M are contained in the zeolitic material as counter-ions at the ion exchange sites of the framework structure in an amount in the range of from 0.5 to 10 wt.-% based on 100 wt.-% of $SiO_2$ contained in the zeolitic material, preferably of 1 to 7 wt.-%, more preferably of 1.5 to 5 wt.-%, more preferably of 2 to 4 wt.-%, more preferably of 2.3 to 3.5 wt.-%, more preferably of 2.5 to 3.2 wt.-%, more preferably of 2.6 to 3 wt.-%, and more preferably of 2.7 to 2.9 wt.-%.

In the case where one or more transition metal elements M are contained in the zeolitic material as counter-ions at the ion exchange sites of the framework structure, no particular restriction applies as regards the molar ratio $M:X_2O_3$ of the one or more transition metal elements M calculated as the element to $X_2O_3$ contained in the zeolitic material. Preferably, the molar ratio $M:X_2O_3$ of the one or more transition metal elements M calculated as the element to $X_2O_3$ contained in the zeolitic material is in the range of from 0.01 to 1.5, more preferably of 0.05 to 1, more preferably of 0.1 to 0.7, more preferably of 0.15 to 0.5, more preferably of 0.18 to 0.3, more preferably of 0.2 to 0.25, and more preferably of 0.21 to 0.23.

Further, it is particularly preferred that one or more transition metal elements M are contained in the zeolitic material as counter-ions at the ion exchange sites of the framework structure, and that the one or more transition metal elements are selected from the group consisting of Fe, Cu, Pd, and Pt, including combinations of two or more thereof, more preferably from the group consisting of Fe, Cu, and Pd, including combinations of two or more thereof, wherein more preferably the zeolitic material further contains Fe and/or Cu, preferably Cu, and that the one or more transition metal elements M contained as counter-ions at the ion exchange sites are in the oxidation state +2 and/or +3, preferably in the oxidation state +2, and that the one or more transition metal elements M are contained in the zeolitic material as counter-ions at the ion exchange sites of the framework structure in an amount in the range of from 0.5 to 10 wt.-% based on 100 wt.-% of $SiO_2$ contained in the zeolitic material, preferably of 1 to 7 wt.-%, more preferably of 1.5 to 5 wt.-%, more preferably of 2 to 4 wt.-%, more preferably of 2.3 to 3.5 wt.-%, more preferably of 2.5 to 3.2 wt.-%, more preferably of 2.6 to 3 wt.-%, and more preferably of 2.7 to 2.9 wt.-%, and that the molar ratio $M:X_2O_3$ of the one or more transition metal elements M calculated as the element to $X_2O_3$ contained in the zeolitic material is in the range of from 0.01 to 1.5, more preferably of 0.05 to 1, more preferably of 0.1 to 0.7, more preferably of 0.15 to 0.5, more preferably of 0.18 to 0.3, more preferably of 0.2 to 0.25, and more preferably of 0.21 to 0.23.

As disclosed above, it is preferred that the zeolitic material has a CHA or AEI-type framework structure. More preferably, the zeolitic material has a CHA-type framework structure. In the case where the zeolitic material has a CHA-type framework structure, it is preferred that the zeolitic material comprises one or more zeolites selected from the group consisting of (Ni(deta)$_2$)-UT-6, Chabazite, |Li—Na| [Al—Si—O]-CHA, DAF-5, LZ-218, Linde D, Linde R, MeAPSO-47, Phi, SAPO-34, SAPO-47, SSZ-13, SSZ-62, UiO-21, Willhendersonite, ZK-14, and ZYT-6, including mixtures of two or more thereof, preferably from the group consisting of Chabazite, DAF-5, LZ-218, Linde D, Linde R, Phi, SSZ-13, SSZ-62, UiO-21, Willhendersonite, ZK-14, and ZYT-6, including mixtures of two or more thereof, more preferably from the group consisting of Chabazite, SSZ-13, SSZ-62, including mixtures of two or more thereof, wherein more preferably the zeolitic material comprises Chabazite and/or SSZ-13, preferably SSZ-13, wherein more preferably the zeolitic material is Chabazite and/or SSZ-13, preferably SSZ-13.

As regards the method for preparing the zeolitic material employed in the present invention, no particular restriction applies. It is preferred that the zeolitic material is obtainable and/or obtained from an organotemplate-free synthetic procedure, preferably from an organotemplate-free synthetic procedure for the preparation of a zeolitic material having a CHA-type framework structure, more preferably according to the process for providing a zeolitic material having a CHA-type framework structure of any of the embodiments disclosed herein.

As disclosed above, it is preferred that the zeolitic material has a CHA or AEI-type framework structure. More preferably, the zeolitic material has a AEI-type framework structure. In the case where the zeolitic material has a AEI-type framework structure, it is preferred that the zeolitic material comprises one or more zeolites selected from the group consisting of SSZ-39, SAPO-18, and SIZ-8, including mixtures of two or more thereof, wherein preferably the zeolitic material comprises SSZ-39, wherein more preferably the zeolitic material is SSZ-39.

As disclosed above, the framework of the zeolitic material comprises $SiO_2$ and $X_2O_3$, wherein X stands for a trivalent element. As regards further elements comprised in the framework of the zeolitic material, no particular restriction applies. It is preferred that the framework of the zeolitic material contains substantially no phosphorous, wherein preferably the zeolitic material contains substantially no phosphorous and/or phosphorous containing compounds.

Within the meaning of the present invention, "substantially" as employed in the present invention with respect to the amount of phosphorous contained in the framework of the zeolitic material indicates an amount of 0.1 wt.-% or less of phosphorous, preferably 0.05 wt.-% or less, more preferably 0.001 wt.-% or less, more preferably 0.0005 wt.-% or less, and even more preferably 0.0001 wt.-% or less thereof. Said amounts of phosphorous, if at all present in the framework of the zeolitic material, may also be denoted as "impurities" or "trace amounts" within the meaning of the present invention.

Further, within the meaning of the present invention, "substantially" as employed in the present invention with respect to the amount of phosphorous and/or phosphorous containing compounds contained in the zeolitic material indicates an amount of 0.1 wt.-% or less of phosphorous and/or phosphorous containing compounds, preferably 0.05 wt.-% or less, more preferably 0.001 wt.-% or less, more preferably 0.0005 wt.-% or less, and even more preferably 0.0001 wt.-% or less thereof. Said amounts of phosphorous and/or phosphorous containing compounds, if at all present in the zeolitic material, may also be denoted as "impurities" or "trace amounts" within the meaning of the present invention.

As disclosed above, the present invention relates to a process for the production of the inventive rare earth element containing zeolitic material.

Thus, the present invention relates to a process for the production of a rare earth element containing zeolitic material having a framework structure selected from the group consisting of AEI, AFT, AFV, AFX, AVL, CHA, EMT, GME, KFI, LEV, LTN, and SFW, including mixtures of two or more thereof, the framework structure of the zeolitic material comprising $SiO_2$ and $X_2O_3$, wherein X stands for a trivalent element, comprising (1) providing a zeolitic material having a framework structure selected from the group consisting of AEI, AFT, AFV, AFX, AVL, CHA, EMT, GME, KFI, LEV, LTN, and SFW, including mixtures of two or more thereof, the framework structure of the zeolitic material comprising $SiO_2$ and $X_2O_3$ displaying an $SiO_2:X_2O_3$ molar ratio in the range of from 2 to 20;
(2) optionally subjecting the zeolitic material provided in (1) to one or more ion exchange procedures with $H^+$ and/or $NH_4^+$, preferably with $NH_4^+$;
(3) subjecting the zeolitic material provided in (1) or obtained in (2) to one or more ion exchange procedures with one or more rare earth elements.

As disclosed above, the zeolitic material provided in (1) has a framework structure selected from the group consisting of AEI, AFT, AFV, AFX, AVL, CHA, EMT, GME, KFI, LEV, LTN, and SFW, including mixtures of two or more thereof. Preferably, the zeolitic material has a framework structure selected from the group consisting of AEI, CHA, GME, LEV, and LTN, including mixtures of two or more thereof, preferably from the group consisting of AEI, CHA, and GME, including mixtures of two or more thereof, wherein more preferably the zeolitic material has a CHA or AEI-type framework structure.

As disclosed above, the $SiO_2:X_2O_3$ molar ratio of the zeolitic material provided in (1) is in the range of from 2 to 30. Preferably, the zeolitic material provided in (1) displays a $SiO_2:X_2O_3$ molar ratio in the range of from 3 to 16, more preferably of 4 to 14, more preferably of 5 to 12, more preferably of 6 to 10, more preferably of 7 to 9, and more preferably of 7.5 to 8.

As disclosed above, the element X of $X_2O_3$ comprised in the zeolitic material provided in (1) stands for a trivalent element. Thus, no particular restriction applies as regards X, as long as it is a trivalent element. Preferably, X is selected from the group consisting of Al, B, In, Ga, and combinations of two or more thereof, more preferably X is selected from the group consisting of Al, Ga, and combinations thereof, X preferably being Al.

Therefore, it is particularly preferred that the zeolitic material provided in (1) has a framework structure selected from the group consisting of AEI, CHA, GME, LEV, and LTN, including mixtures of two or more thereof, preferably from the group consisting of AEI, CHA, and GME, including mixtures of two or more thereof, wherein more preferably the zeolitic material has a CHA or AEI-type framework structure, and that the zeolitic material provided in (1) displays a $SiO_2:X_2O_3$ molar ratio in the range of from 3 to 16, more preferably of 4 to 14, more preferably of 5 to 12, more preferably of 6 to 10, more preferably of 7 to 9, and more preferably of 7.5 to 8, and that X is selected from the group consisting of Al, B, In, Ga, and combinations of two or more thereof, more preferably X is selected from the group consisting of Al, Ga, and combinations thereof, X preferably being Al.

As regards the one or more rare earth elements for subjecting the zeolitic material provided in (1) or obtained in (2) to one or more ion exchange procedures according to (3), no particular restriction applies. Thus, the one or more rare earth elements are selected from the group consisting of La, Ce, Pr, Nd, Sm, Eu, Gd, Tb, Dy, Ho, Er, Tm, Yb, Lu, Y, and Sc. Preferably, the one or more rare earth elements in (3) are selected from the group consisting of Y, La, Ce, Sm, and Yb, including combinations of two or more thereof, more preferably from the group consisting of Y, La, Sm, and Yb, including combinations of two or more thereof, wherein more preferably the one or more rare earth elements are Y and/or Yb, preferably Y.

As regards the oxidation state of the one or more rare earth elements contained as counter-ions at the ion exchange sites in (3), no particular restriction applies. Preferably, the one or more rare earth elements contained as counter-ions at the ion exchange sites are in the oxidation state +2 and/or +3, more preferably in the oxidation state +3.

Therefore, it is particularly preferred that the one or more rare earth elements for subjecting the zeolitic material provided in (1) or obtained in (2) to one or more ion exchange procedures according to (3) are selected from the group consisting of Y, La, Ce, Sm, and Yb, including combinations of two or more thereof, more preferably from the group consisting of Y, La, Sm, and Yb, including combinations of two or more thereof, wherein more preferably the one or more rare earth elements are Y and/or Yb, preferably Y, and that the one or more rare earth elements contained as counter-ions at the ion exchange sites are in the oxidation state +2 and/or +3, more preferably in the oxidation state +3.

As disclosed above, it is preferred that the zeolitic material provided in (1) has a CHA or AEI-type framework structure. More preferably, the zeolitic material provided in (1) has a CHA-type framework structure. In the case where the zeolitic material has a CHA-type framework structure, it is preferred that the zeolitic material provided in (1) comprises one or more zeolites selected from the group consisting of (Ni(deta)$_2$)-UT-6, Chabazite, |Li—Na| [Al—Si—O]-CHA, DAF-5, LZ-218, Linde D, Linde R, MeAPSO-47, Phi, SAPO-34, SAPO-47, SSZ-13, SSZ-62, UiO-21, Willhendersonite, ZK-14, and ZYT-6, including mixtures of two or more thereof, preferably from the group consisting of Chabazite, DAF-5, LZ-218, Linde D, Linde R, Phi, SSZ-13, SSZ-62, UiO-21, Willhendersonite, ZK-14, and ZYT-6, including mixtures of two or more thereof, more preferably from the group consisting of Chabazite, SSZ-13, SSZ-62, including mixtures of two or more thereof, wherein more preferably the zeolitic material comprises Chabazite and/or SSZ-13, preferably SSZ-13, wherein more preferably the zeolitic material is Chabazite and/or SSZ-13, preferably SSZ-13.

As disclosed above, it is preferred that the zeolitic material provided in (1) has a CHA or AEI-type framework structure. More preferably, the zeolitic material provided in (1) has a AEI-type framework structure. In the case where the zeolitic material has a AEI-type framework structure, it is preferred that the zeolitic material provided in (1) comprises one or more zeolites selected from the group consisting of SSZ-39, SAPO-18, and SIZ-8, including mixtures of two or more thereof, wherein preferably the zeolitic material comprises SSZ-39, wherein more preferably the zeolitic material is SSZ-39.

As disclosed above, the framework of the zeolitic material comprises $SiO_2$ and $X_2O_3$, wherein X stands for a trivalent element. As regards further elements comprised in the framework of the zeolitic material, no particular restriction applies. It is preferred that the framework of the zeolitic material provided in (1) contains substantially no phosphorous, wherein preferably the zeolitic material provided in (1) contains substantially no phosphorous and/or phosphorous containing compounds.

As disclosed above, no particular restriction applies as regards the method for preparing the zeolitic material employed in the present invention. It is preferred that the zeolitic material provided in (1) is obtainable and/or obtained according to an organotemplate-free synthetic procedure.

Within the meaning of the present invention, an "organotemplate-free synthetic procedure" relates to a synthetic process wherein the materials used therein are substantially free of organotemplate compounds, wherein "substantially" as employed in the present invention with respect to the amount of one or more organotemplates contained in the one or more materials used in a synthetic process indicates an amount of 0.1 wt.-% or less of one or more organotemplates, preferably 0.05 wt.-% or less, more preferably 0.001 wt.-% or less, more preferably 0.0005 wt.-% or less, and even more preferably 0.0001 wt.-% or less thereof. Said amounts of one or more organotemplates, if at all present in any one of the materials used in the synthetic process, may also be denoted as "impurities" or "trace amounts" within the meaning of the present invention.

Further, it is preferred that (1) comprises a process for providing a zeolitic material having a CHA-type framework structure comprising (1a) preparing a mixture comprising one or more sources of $SiO_2$, one or more sources of $X_2O_3$, seed crystals having a CHA-type framework structure, and $H_2O$;

(1b) crystallizing a zeolitic material having a CHA-type framework structure comprising $SiO_2$ and $X_2O_3$ from the mixture obtained in (1a), wherein the mixture is heated to a temperature in the range of from 80 to 200° C.;

(1c) isolating the zeolitic material obtained in (1b), preferably by filtration; and/or (1d) optionally washing the zeolitic material obtained in (1b) or (1c), preferably with distilled water; and/or (1e) optionally drying the zeolitic material obtained in (1 b), (1c), or (1d).

In the case where (1) comprises a process as disclosed above for providing a zeolitic material having a CHA-type framework structure, it is preferred that the mixture prepared in (1a) and crystallized in (1b) does not comprise an organotemplate.

The term "organotemplate" as employed in the present application designates any conceivable organic compound which is suitable for template-mediated synthesis of a zeolitic material, preferably of a zeolitic material having a CHA-type framework-structure, and even more preferably which is suitable for the synthesis of SSZ-13. Such organotemplates include e.g. any suitable tetraalkylammonium compound, dialkyl amine, heterocyclic amine, N-alkyl-3-quinuclidinol compound, N,N,N-trialkyl-exoaminonorbornane compound, N,N,N-trimethyl-1-adamantylammonium compound, N,N,N-trimethyl-2-adamantylammonium compound, N,N,N-trimethylcyclohexylammonium compound, N,N-dimethyl-3,3-dimethylpiperidinium compound, N,N-methylethyl-3,3-dimethylpiperidinium compound, N,N-dimethyl-2-methylpiperidinium compound, 1,3,3,6,6-pentamethyl-6-azonio-bicyclo(3.2.1)octane compound, N,N-dimethylcyclohexylamine compound, and any suitable N,N,N-trimethylbenzylammonium compound.

In the case where (1) comprises a process as disclosed above for providing a zeolitic material having a CHA-type framework structure, it is preferred that the mixture prepared in (1a) and crystallized in (1b) contains substantially no phosphorous and/or phosphorous containing compounds.

As disclosed above, within the meaning of the present invention, "substantially" as employed in the present invention with respect to the amount of phosphorous and/or phosphorous containing compounds contained in the one or more materials used in a synthetic process indicates an amount of 0.1 wt.-% or less of phosphorous and/or phosphorous containing compounds, preferably 0.05 wt.-% or less, more preferably 0.001 wt.-% or less, more preferably 0.0005 wt.-% or less, and even more preferably 0.0001 wt.-% or less thereof. Said amounts of phosphorous and/or phosphorous containing compounds, if at all present in any one of the materials used in the synthetic process, may also be denoted as "impurities" or "trace amounts" within the meaning of the present invention.

In the case where (1) comprises a process as disclosed above for providing a zeolitic material having a CHA-type framework structure, the mixture in (1b) is heated to a temperature in the range of from 80 to 200° C. It is preferred that the mixture in (1b) is heated to a temperature in the range of from 90 to 180° C., more preferably from 100 to 160° C., more preferably from 110 to 140° C., and more preferably from 115 to 130° C.

Further, no restriction applies to the duration in which heating in (1b) is effected. It is preferred that heating in (1b) is effected for a duration in the range of from 5 to 200 h, more preferably from 20 to 160 h, more preferably from 60 to 140 h, and more preferably from 100 to 130 h. Further, no restriction applies to the pressure under which heating in (1b) is effected. It is preferred that heating in (1b) is effected under autogenous pressure. In this regard, it is particularly preferred that heating in (1b) is effected in an autoclave.

Therefore, it is particularly preferred in the case where (1) comprises a process as disclosed above for providing a zeolitic material having a CHA-type framework structure, that the mixture in (1b) is heated to a temperature in the range of from 80 to 200° C., more preferably from 90 to 180° C., more preferably from 100 to 160° C., more preferably from 110 to 140° C., and more preferably from 115 to 130° C., and that heating in (1b) is effected for a duration in the range of from 5 to 200 hours, more preferably from 20 to 160 hours, more preferably from 60 to 140 hours, and more preferably from 100 to 130 hours, and that heating in (1 b) is effected under autogenous pressure, preferably in an autoclave.

Further, in the case where (1) comprises a process as disclosed above for providing a zeolitic material having a CHA-type framework structure, no restriction applies to the $SiO_2:X_2O_3$ molar ratio of the one or more sources of $SiO_2$, calculated as $SiO_2$, to the one or more sources for $X_2O_3$, calculated as $X_2O_3$, respectively contained in the mixture prepared in (1a) and crystallized in (1b). It is preferred that the $SiO_2:X_2O_3$ molar ratio of the one or more sources of $SiO_2$, calculated as $SiO_2$, to the one or more sources for $X_2O_3$, calculated as $X_2O_3$, respectively contained in the mixture prepared in (1a) and crystallized in (1b) is in the range of from 1 to 200, preferably from 2 to 150, more preferably from 5 to 100, more preferably from 10 to 70, more preferably from 15 to 50, more preferably from 20 to 45, and more preferably from 25 to 42.

Further, in the case where (1) comprises a process as disclosed above for providing a zeolitic material having a CHA-type framework structure, no particular restriction applies as regards the one or more sources for $SiO_2$. It is preferred that the one or more sources for $SiO_2$ comprises one or more silicates, more preferably one or more alkali metal silicates, wherein the alkali metal is preferably selected from the group consisting of Li, Na, K, Rb, and Cs, wherein more preferably the alkali metal is Na and/or K, and wherein even more preferably the alkali metal is Na.

Further, in the case where the one or more sources for $SiO_2$ comprises one or more silicates as disclosed above, the mixture prepared in (1a) may further comprise one or more silicas in addition to the one or more silicates, preferably one or more silica hydrosols and/or one or more colloidal silicas, and even more preferably one or more colloidal silicas in addition to the one or more silicates.

Further, in the case where the one or more sources for $SiO_2$ comprises one or more silicates as disclosed above, the mixture prepared in (1a) may further comprise water glass, preferably sodium and/or potassium silicate, more preferably sodium silicate.

Therefore, it is particularly preferred that in the case where the one or more sources for $SiO_2$ comprises one or more silicates as disclosed above, the mixture prepared in (1a) further comprises one or more silicas in addition to the one or more silicates, preferably one or more silica hydrosols and/or one or more colloidal silicas, and even more preferably one or more colloidal silicas in addition to the one or more silicates, and that the mixture prepared in (1a) further comprises water glass, preferably sodium and/or potassium silicate, more preferably sodium silicate.

Further, in the case where (1) comprises a process as disclosed above for providing a zeolitic material having a CHA-type framework structure, no particular restriction applies to the one or more sources for $X_2O_3$. It is preferred that the one or more sources for $X_2O_3$ comprise one or more aluminate salts, more preferably one or more alkali metal aluminates, wherein the alkali metal is preferably selected from the group consisting of Li, Na, K, Rb, and Cs, wherein more preferably the alkali metal is Na and/or K, and wherein even more preferably the alkali metal is Na.

Further, in the case where (1) comprises a process as disclosed above for providing a zeolitic material having a CHA-type framework structure, no particular restriction applies to the $H_2O:SiO_2$ molar ratio in the mixture prepared in (1a) and crystallized in (1 b). It is preferred that the $H_2O:SiO_2$ molar ratio in the mixture prepared in (1a) and crystallized in (1b) is in the range of from 1 to 150, preferably from 3 to 100, more preferably from 5 to 50, more preferably from 10 to 30, more preferably from 15 to 25, and even more preferably from 16 to 19.

Therefore, it is particularly preferred that in the case where (1) comprises a process as disclosed above for providing a zeolitic material having a CHA-type framework structure the $SiO_2:X_2O_3$ molar ratio of the one or more sources of $SiO_2$, calculated as $SiO_2$, to the one or more sources for $X_2O_3$, calculated as $X_2O_3$, respectively contained in the mixture prepared in (1a) and crystallized in (1b) is in the range of from 1 to 200, preferably from 2 to 150, more preferably from 5 to 100, more preferably from 10 to 70, more preferably from 15 to 50, more preferably from 20 to 45, and more preferably from 25 to 42, and that that the $H_2O:SiO_2$ molar ratio in the mixture prepared in (1a) and crystallized in (1 b) is in the range of from 1 to 150, preferably from 3 to 100, more preferably from 5 to 50, more preferably from 10 to 30, more preferably from 15 to 25, and even more preferably from 16 to 19.

Further, in the case where (1) comprises a process as disclosed above for providing a zeolitic material having a CHA-type framework structure, no particular restriction applies to the seed crystals having a CHA-type framework structure. It is preferred that the seed crystals having a CHA-type framework structure comprise one or more zeolites selected from the group consisting of $(Ni(deta)_2)$-UT-6, Chabazite, |Li—Na| [Al—Si—O]-CHA, DAF-5, LZ-218, Linde D, Linde R, MeAPSO-47, Phi, SAPO-34, SAPO-47, SSZ-13, SSZ-62, UiO-21, Willhendersonite, ZK-14, and ZYT-6, including mixtures of two or more thereof, more preferably from the group consisting of Chabazite, DAF-5, LZ-218, Linde D, Linde R, Phi, SSZ-13, SSZ-62, UiO-21, Willhendersonite, ZK-14, and ZYT-6, including mixtures of two or more thereof, more preferably from the group consisting of Chabazite, SSZ-13, SSZ-62, including mixtures of two or more thereof, wherein more preferably the seed crystals having a CHA-type framework structure comprise Chabazite and/or SSZ-13, and preferably SSZ-13, wherein more preferably Chabazite and/or SSZ-13, and preferably SSZ-13 is employed as the seed crystals.

Further, in the case where (1) comprises a process as disclosed above for providing a zeolitic material having a CHA-type framework structure, it is preferred that the seed crystals having a CHA-type framework structure comprise a zeolitic material as obtainable and/or obtained according to an organotemplate-free synthetic procedure, preferably according to the process for providing a zeolitic material having a CHA-type framework structure as disclosed herein.

Further, in the case where (1) comprises a process as disclosed above for providing a zeolitic material having a CHA-type framework structure, no particular restriction applies to the amount of seed crystals in the mixture prepared in (1a). It is preferred that the amount of seed crystals in the mixture prepared in (1a) is in the range of from 0.05 to 50 wt.-% based on 100 wt.-% of the one or more sources of $SiO_2$ contained in the mixture, calculated as $SiO_2$, preferably from 0.1 to 30 wt.-%, more preferably from 0.5 to 20 wt.-%, more preferably from 1 to 15 wt.-%, more preferably from 5 to 12 wt.-%, and even more preferably from 9 to 11 wt.-%.

Therefore, it is particularly preferred that in the case where (1) comprises a process as disclosed above for providing a zeolitic material having a CHA-type framework structure that the seed crystals having a CHA-type framework structure comprise one or more zeolites selected from the group consisting of (Ni(deta)$_2$)-UT-6, Chabazite, |Li—Na| [Al—Si—O]-CHA, DAF-5, LZ-218, Linde D, Linde R, MeAPSO-47, Phi, SAPO-34, SAPO-47, SSZ-13, SSZ-62, UiO-21, Willhendersonite, ZK-14, and ZYT-6, including mixtures of two or more thereof, more preferably from the group consisting of Chabazite, DAF-5, LZ-218, Linde D, Linde R, Phi, SSZ-13, SSZ-62, UiO-21, Willhendersonite, ZK-14, and ZYT-6, including mixtures of two or more thereof, more preferably from the group consisting of Chabazite, SSZ-13, SSZ-62, including mixtures of two or more thereof, wherein more preferably the seed crystals having a CHA-type framework structure comprise Chabazite and/or SSZ-13, and preferably SSZ-13, wherein more preferably Chabazite and/or SSZ-13, and preferably SSZ-13 is employed as the seed crystals, and that the amount of seed crystals in the mixture prepared in (1a) is in the range of from 0.05 to 50 wt.-% based on 100 wt.-% of the one or more sources of $SiO_2$ contained in the mixture, calculated as $SiO_2$, preferably from 0.1 to 30 wt.-%, more preferably from 0.5 to 20 wt.-%, more preferably from 1 to 15 wt.-%, more preferably from 5 to 12 wt.-%, and even more preferably from 9 to 11 wt.-%.

As regards the process for the production of the inventive rare earth element containing zeolitic material, further process steps may be comprised therein. In particular, one or more additional ion exchange procedures may be performed after (3). It is preferred that the process further comprises (4) subjecting the zeolitic material obtained in (3) to one or more ion exchange procedures with one or more transition metal elements M selected from the group consisting of Cr, Fe, Co, Ni, Cu, Zn, Pd, and Pt, including mixtures of two or more thereof; wherein preferably the one or more transition metal elements M are selected from the group consisting of Fe, Cu, Pd, and Pt, including mixtures of two or more thereof, more preferably from the group consisting of Fe, Cu, and Pd, including mixtures of two or more thereof.

Further, in the case where (1) comprises a process for providing a zeolitic material having a CHA-type framework structure, it is particularly preferred that the zeolitic material obtained in (1 b), (1c), (1d), or (1e) is subject to one or more ion exchange procedures with Fe and/or Cu, preferably with Cu.

In the case where the process as disclosed above further comprises (4) subjecting the zeolitic material obtained in (3) to one or more ion exchange procedures with one or more transition metal elements M, no particular restriction applies as regards the oxidation state of the transition metal elements M. It is preferred that the one or more transition metal elements M are in the oxidation state +2.

As disclosed above, the present invention relates to a rare earth element containing zeolitic material as obtainable and/or obtained according to the process as disclosed herein.

Further, as disclosed above, the present invention relates to the use of the inventive rare earth element containing zeolitic material. Thus, the rare earth element containing zeolitic material according to any one of the embodiments disclosed herein can be used as a molecular sieve, as an adsorbent, for ion-exchange, as a catalyst or a precursor thereof, and/or as a catalyst support or a precursor thereof, preferably as a catalyst or a precursor thereof and/or as a catalyst support or a precursor thereof, more preferably as a catalyst or a precursor thereof, more preferably as a catalyst for the selective catalytic reduction (SCR) of nitrogen oxides $NO_R$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_R$, and more preferably for the selective catalytic reduction (SCR) of nitrogen oxides $NO_x$ in exhaust gas from a combustion engine, preferably from a diesel engine or from a lean burn gasoline engine.

The present invention is further illustrated by the following embodiments and combinations of embodiments as indicated by the respective dependencies and back-references. In particular, it is noted that in each instance where a combination of embodiments is mentioned as a range, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4". Further, it is explicitly noted that the following set of embodiments is not the set of claims determining the extent of protection, but represents a suitably structured part of the description directed to general and preferred aspects of the present invention. Thus, the present invention includes the following embodiments, wherein these include the specific combinations of embodiments as indicated by the respective interdependencies defined therein:

1. A rare earth element containing zeolitic material having a framework structure selected from the group consisting of AEI, AFT, AFV, AFX, AVL, CHA, EMT, GME, KFI, LEV, LTN, and SFW, including mixtures of two or more thereof, the framework structure of the zeolitic material comprising $SiO_2$ and $X_2O_3$, wherein X stands for a trivalent element, wherein the zeolitic material displays an $SiO_2:X_2O_3$ molar ratio in the range of from 2 to 20, and wherein the zeolitic material contains one or more rare earth elements as counter-ions at the ion exchange sites of the framework structure.
2. The zeolitic material of embodiment 1, wherein the zeolitic material has a framework structure selected from the group consisting of AEI, CHA, GME, LEV, and LTN, including mixtures of two or more thereof, preferably from the group consisting of AEI, CHA, and GME, including mixtures of two or more thereof, wherein more preferably the zeolitic material has a CHA or AEI-type framework structure.
3. The zeolitic material of embodiment 1 or 2, wherein the zeolitic material displays an $SiO_2:X_2O_3$ molar ratio in the range of from 3 to 16, preferably of 4 to 14, more preferably of 5 to 12, more preferably of 6 to 10, more preferably of 7 to 9, and more preferably of 7.5 to 8.
4. The zeolitic material of any one of embodiments 1 to 3, wherein X is selected from the group consisting of Al, B, In, Ga, and combinations of two or more thereof, X preferably being Al.

5. The zeolitic material of any one of embodiments 1 to 4, wherein the effective ionic radius of the one or more rare earth elements contained as counter-ions at the ion exchange sites of the framework structure of the zeolitic material 1.3 angstroms or less, preferably 1.25 angstroms or less, more preferably 1.2 angstroms or less, more preferably 1.15 angstroms or less, more preferably 1.1 angstroms or less, more preferably 1.05 angstroms or less, more preferably 1.0 angstroms or less, more preferably 0.95 angstroms or less, more preferably 0.9 angstroms or less, and more preferably 0.88 angstroms or less.

6. The zeolitic material of any one of embodiments 1 to 5, wherein the one or more rare earth elements are selected from the group consisting of La, Ce, Pr, Nd, Sm, Eu, Gd, Tb, Dy, Ho, Er, Tm, Yb, Lu, Y, and Sc, including combinations of two or more thereof, preferably from the group consisting of Pr, Nd, Sm, Eu, Gd, Tb, Dy, Ho, Er, Tm, Yb, Lu, Y, and Sc, including combinations of two or more thereof, more preferably from the group consisting of Sm, Eu, Gd, Tb, Dy, Ho, Er, Tm, Yb, Lu, Y, and Sc, including combinations of two or more thereof, more preferably from the group consisting of Yb, Lu, Y, and Sc, including combinations of two or more thereof, wherein more preferably the one or more rare earth elements are Y and/or Yb, preferably Y.

7. The zeolitic material of any one of embodiments 1 to 6, wherein the one or more rare earth elements contained as counter-ions at the ion exchange sites are in the oxidation state +2 and/or +3, preferably in the oxidation state +3.

8. The zeolitic material of any one of embodiments 1 to 7, wherein the one or more rare earth elements are contained in the zeolitic material in an amount in the range of from 0.1 to 7 wt.-% based on 100 wt.-% of $SiO_2$ contained in the zeolitic material, preferably of 0.3 to 5 wt.-%, more preferably of 0.4 to 4 wt.-%, more preferably of 0.5 to 3.5 wt.-%, more preferably of 0.6 to 3 wt.-%, more preferably of 0.7 to 2.5 wt.-%, more preferably of 0.75 to 2 wt.-%, more preferably of 0.5 to 1.5 wt.-%, more preferably of 0.8 to 1.7 wt.-%, more preferably of 0.85 to 1.5 wt.-%, more preferably of 0.9 to 1.3 wt.-%, more preferably of 0.95 to 1.2 wt.-%, and more preferably of 1 to 1.1 wt.-%.

9. The zeolitic material of any one of embodiments 1 to 8, wherein the molar ratio RE:$X_2O_3$ of the one or more rare earth elements (RE) calculated as the element to $X_2O_3$ contained in the zeolitic material is in the range of from 0.01 to 0.3, preferably of 0.02 to 0.22, more preferably of 0.03 to 0.17, more preferably of 0.035 to 0.13, more preferably of 0.03 to 0.1, more preferably of 0.035 to 0.08, more preferably of 0.04 to 0.06, more preferably of 0.043 to 0.05, and more preferably of 0.045 to 0.047.

10. The zeolitic material of any one of embodiments 1 to 9, wherein the zeolitic material further contains one or more transition metal elements M selected from the group consisting of Cr, Fe, Co, Ni, Cu, Zn, Pd, and Pt, including combinations of two or more thereof, as counter-ions at the ion exchange sites of the framework structure, wherein preferably the one or more transition metal elements are selected from the group consisting of Fe, Cu, Pd, and Pt, including combinations of two or more thereof, more preferably from the group consisting of Fe, Cu, and Pd, including combinations of two or more thereof, wherein more preferably the zeolitic material further contains Fe and/or Cu, preferably Cu.

11. The zeolitic material of embodiment 10, wherein the one or more transition metal elements M contained as counter-ions at the ion exchange sites are in the oxidation state +2 and/or +3, preferably in the oxidation state +2.

12. The zeolitic material of embodiment 10 or 11, wherein the one or more transition metal elements M are contained in the zeolitic material in an amount in the range of from 0.5 to 10 wt.-% based on 100 wt.-% of $SiO_2$ contained in the zeolitic material, preferably of 1 to 7 wt.-%, more preferably of 1.5 to 5 wt.-%, more preferably of 2 to 4 wt.-%, more preferably of 2.3 to 3.5 wt.-%, more preferably of 2.5 to 3.2 wt.-%, more preferably of 2.6 to 3 wt.-%, and more preferably of 2.7 to 2.9 wt.-%.

13. The zeolitic material of any one of embodiments 10 to 12, wherein the molar ratio M:$X_2O_3$ of the one or more transition metal elements M calculated as the element to $X_2O_3$ contained in the zeolitic material is in the range of from 0.01 to 1.5, preferably of 0.05 to 1, more preferably of 0.1 to 0.7, more preferably of 0.15 to 0.5, more preferably of 0.18 to 0.3, more preferably of 0.2 to 0.25, and more preferably of 0.21 to 0.23.

14. The zeolitic material of any one of embodiments 1 to 13, wherein the zeolitic material having a CHA-type framework structure comprises one or more zeolites selected from the group consisting of (Ni(deta)$_2$)-UT-6, Chabazite, |Li—Na| [Al—Si—O]-CHA, DAF-5, LZ-218, Linde D, Linde R, MeAPSO-47, Phi, SAPO-34, SAPO-47, SSZ-13, SSZ-62, UiO-21, Willhendersonite, ZK-14, and ZYT-6, including mixtures of two or more thereof, preferably from the group consisting of Chabazite, DAF-5, LZ-218, Linde D, Linde R, Phi, SSZ-13, SSZ-62, UiO-21, Willhendersonite, ZK-14, and ZYT-6, including mixtures of two or more thereof,
more preferably from the group consisting of Chabazite, SSZ-13, SSZ-62, including mixtures of two or more thereof,
wherein more preferably the zeolitic material comprises Chabazite and/or SSZ-13, preferably SSZ-13,
wherein more preferably the zeolitic material is Chabazite and/or SSZ-13, preferably SSZ-13.

15. The zeolitic material of any one of embodiments 1 to 14, wherein the zeolitic material is obtainable and/or obtained from an organotemplate-free synthetic procedure, preferably from an organotemplate-free synthetic procedure for the preparation of a zeolitic material having a CHA-type framework structure, more preferably according to the process for providing a zeolitic material having a CHA-type framework structure of any of embodiments 28 to 42.

16. The zeolitic material of any one of embodiments 1 to 15, wherein the zeolitic material having an AEI-type framework structure comprises one or more zeolites selected from the group consisting of SSZ-39, SAPO-18, and SIZ-8, including mixtures of two or more thereof,
wherein preferably the zeolitic material comprises SSZ-39, wherein more preferably the zeolitic material is SSZ-39.

17. The zeolitic material of any one of embodiments 1 to 16, wherein the framework of the zeolitic material contains substantially no phosphorous, wherein preferably the zeolitic material contains substantially no phosphorous and/or phosphorous containing compounds.

18. A process for the production of a rare earth element containing zeolitic material having a framework structure selected from the group consisting of AEI, AFT, AFV, AFX, AVL, CHA, EMT, GME, KFI, LEV, LTN, and SFW, including mixtures of two or more thereof, the framework structure of the zeolitic material comprising $SiO_2$ and $X_2O_3$, wherein X stands for a trivalent element, comprising
(1) providing a zeolitic material having a framework structure selected from the group consisting of AEI, AFT, AFV, AFX, AVL, CHA, EMT, GME, KFI, LEV, LTN, and SFW, including mixtures of two or more thereof, the framework structure of the zeolitic material comprising $SiO_2$ and $X_2O_3$ displaying an $SiO_2:X_2O_3$ molar ratio in the range of from 2 to 20;

(2) optionally subjecting the zeolitic material provided in (1) to one or more ion exchange procedures with $H^+$ and/or $NH_4^+$, preferably with $NH_4^+$;

(3) subjecting the zeolitic material provided in (1) or obtained in (2) to one or more ion exchange procedures with one or more rare earth elements.

19. The process of embodiment 18, wherein the zeolitic material has a framework structure selected from the group consisting of AEI, CHA, GME, LEV, and LTN, including mixtures of two or more thereof, preferably from the group consisting of AEI, CHA, and GME, including mixtures of two or more thereof, wherein more preferably the zeolitic material has a CHA or AEI-type framework structure.

20. The process of embodiment 18 or 19, wherein the zeolitic material provided in (1) displays an $SiO_2:X_2O_3$ molar ratio in the range of from 3 to 16, preferably of 4 to 14, more preferably of 5 to 12, more preferably of 6 to 10, more preferably of 7 to 9, and more preferably of 7.5 to 8.

21. The process of any one of embodiments 18 to 20, wherein X is selected from the group consisting of Al, B, In, Ga, and combinations of two or more thereof, X preferably being Al.

22. The process of any one of embodiments 18 to 21, wherein in (3) the one or more rare earth elements are selected from the group consisting of Y, La, Ce, Sm, and Yb, including combinations of two or more thereof, preferably from the group consisting of Y, La, Sm, and Yb, including combinations of two or more thereof, wherein more preferably the one or more rare earth elements are Y and/or Yb, preferably Y.

23. The process of any of embodiments 18 to 22, wherein in (3) the one or more rare earth elements contained as counter-ions at the ion exchange sites are in the oxidation state +3.

24. The process of any one of embodiments 18 to 23, wherein the zeolitic material having a CHA-type framework structure provided in (1) comprises one or more zeolites selected from the group consisting of (Ni(deta)$_2$)-UT-6, Chabazite, |Li—Na| [Al—Si—O]-CHA, DAF-5, LZ-218, Linde D, Linde R, MeAPSO-47, Phi, SAPO-34, SAPO-47, SSZ-13, SSZ-62, UiO-21, Willhendersonite, ZK-14, and ZYT-6, including mixtures of two or more thereof, preferably from the group consisting of Chabazite, DAF-5, LZ-218, Linde D, Linde R, Phi, SSZ-13, SSZ-62, UiO-21, Willhendersonite, ZK-14, and ZYT-6, including mixtures of two or more thereof, more preferably from the group consisting of Chabazite, SSZ-13, SSZ-62, including mixtures of two or more thereof,
wherein more preferably the zeolitic material comprises Chabazite and/or SSZ-13, preferably SSZ-13,
wherein more preferably the zeolitic material is Chabazite and/or SSZ-13, preferably SSZ-13.

25. The process of any one of embodiments 18 to 24, wherein the zeolitic material having an AEI-type framework structure provided in (1) comprises one or more zeolites selected from the group consisting of SSZ-39, SAPO-18, and SIZ-8, including mixtures of two or more thereof, wherein preferably the zeolitic material comprises SSZ-39, wherein more preferably the zeolitic material is SSZ-39.

26. The process of any one of embodiments 18 to 25, wherein the framework of the zeolitic material provided in (1) contains substantially no phosphorous, wherein preferably the zeolitic material provided in (1) contains substantially no phosphorous and/or phosphorous containing compounds.

27. The process of embodiment 26, wherein the zeolitic material provided in (1) is obtainable and/or obtained according to an organotemplate-free synthetic procedure.

28. The process of any one of embodiments 18 to 27, wherein (1) comprises a process for providing a zeolitic material having a CHA-type framework structure comprising
(1a) preparing a mixture comprising one or more sources of $SiO_2$, one or more sources of $X_2O_3$, seed crystals having a CHA-type framework structure, and $H_2O$;
(1b) crystallizing a zeolitic material having a CHA-type framework structure comprising $SiO_2$ and $X_2O_3$ from the mixture obtained in (1a), wherein the mixture is heated to a temperature in the range of from 80 to 200° C.;
(1c) isolating the zeolitic material obtained in (1b), preferably by filtration;
and/or
(1d) optionally washing the zeolitic material obtained in (1b) or (1c), preferably with distilled water;
and/or
(1e) optionally drying the zeolitic material obtained in (1 b), (1c), or (1d).

29. The process of embodiment 28, wherein the mixture prepared in (1a) and crystallized in (1b) does not comprise an organotemplate.

30. The process of embodiment 28 or 29, wherein the mixture prepared in (1a) and crystallized in (1b) contains substantially no phosphorous and/or phosphorous containing compounds.

31. The process of any one of embodiments 28 to 30, wherein the mixture in (1b) is heated to a temperature in the range of from 90 to 180° C., preferably from 100 to 160° C., more preferably from 110 to 140° C., and more preferably from 115 to 130° C.

32. The process of any one of embodiments 28 to 31, wherein heating in (1b) is effected for a duration in the range of from 5 to 200 h, preferably from 20 to 160 h, more preferably from 60 to 140 h, and more preferably from 100 to 130 h.

33. The process of any one of embodiments 28 to 32, wherein heating in (1b) is effected under autogenous pressure, wherein preferably heating in (1b) is effected in an autoclave.

34. The process of any one of embodiments 28 to 33, wherein the $SiO_2:X_2O_3$ molar ratio of the one or more sources of $SiO_2$, calculated as $SiO_2$, to the one or more sources for $X_2O_3$, calculated as $X_2O_3$, respectively contained in the mixture prepared in (1a) and crystallized in (1b) is in the range of from 1 to 200, preferably from 2 to 150, more preferably from 5 to 100, more preferably from 10 to 70, more preferably from 15 to 50, more preferably from 20 to 45, and more preferably from 25 to 42.

35. The process of any one of embodiments 28 to 34, wherein the one or more sources for $SiO_2$ comprises one or more silicates, preferably one or more alkali metal silicates, wherein the alkali metal is preferably selected from the group consisting of Li, Na, K, Rb, and Cs, wherein more preferably the alkali metal is Na and/or K, and wherein even more preferably the alkali metal is Na.

36. The process of embodiment 35, wherein the mixture prepared in (1a) further comprises one or more silicas in addition to the one or more silicates, preferably one or more silica hydrosols and/or one or more colloidal silicas, and even more preferably one or more colloidal silicas in addition to the one or more silicates.

37. The process of embodiment 35 or 36, wherein the mixture prepared in (1a) comprises water glass, preferably sodium and/or potassium silicate, more preferably sodium silicate.

38. The process of any one of embodiments 28 to 37, wherein the one or more sources for $X_2O_3$ comprise one or more aluminate salts, preferably on or more alkali metal aluminates, wherein the alkali metal is preferably selected from the group consisting of Li, Na, K, Rb, and Cs, wherein more preferably the alkali metal is Na and/or K, and wherein even more preferably the alkali metal is Na.

39. The process of any one of embodiments 28 to 38, wherein the $H_2O:SiO_2$ molar ratio in the mixture prepared in (1a) and crystallized in (1 b) is in the range of from 1 to 150, preferably from 3 to 100, more preferably from 5 to 50, more preferably from 10 to 30, more preferably from 15 to 25, and even more preferably from 16 to 19.

40. The process of any one of embodiments 28 to 39, wherein the seed crystals having a CHA-type framework structure comprise one or more zeolites selected from the group consisting of (Ni(deta)$_2$)-UT-6, Chabazite, |Li—Na| [Al—Si—O]-CHA, DAF-5, LZ-218, Linde D, Linde R, MeAPSO-47, Phi, SAPO-34, SAPO-47, SSZ-13, SSZ-62, UiO-21, Willhendersonite, ZK-14, and ZYT-6, including mixtures of two or more thereof, preferably from the group consisting of Chabazite, DAF-5, LZ-218, Linde D, Linde R, Phi, SSZ-13, SSZ-62, UiO-21, Willhendersonite, ZK-14, and ZYT-6, including mixtures of two or more thereof, more preferably from the group consisting of Chabazite, SSZ-13, SSZ-62, including mixtures of two or more thereof, wherein more preferably the seed crystals having a CHA-type framework structure comprise Chabazite and/or SSZ-13, and preferably SSZ-13, wherein more preferably Chabazite and/or SSZ-13, and preferably SSZ-13 is employed as the seed crystals.

41. The process of any one of embodiments 28 to 40, wherein the seed crystals having a CHA-type framework structure comprise a zeolitic material as obtainable and/or obtained according to an organotemplate-free synthetic procedure, preferably according to the process for providing a zeolitic material having a CHA-type framework structure of any one of embodiments 28 to 39.

42. The process of any one of embodiments 28 to 41, wherein the amount of seed crystals in the mixture prepared in (1a) is in the range of from 0.05 to 50 wt.-% based on 100 wt.-% of the one or more sources of $SiO_2$ contained in the mixture, calculated as $SiO_2$, preferably from 0.1 to 30 wt.-%, more preferably from 0.5 to 20 wt.-%, more preferably from 1 to 15 wt.-%, more preferably from 5 to 12 wt.-%, and even more preferably from 9 to 11 wt. %.

43. The process of any one of embodiments 18 to 42, wherein the process further comprises (4) subjecting the zeolitic material obtained in (3) to one or more ion exchange procedures with one or more transition metal elements M selected from the group consisting of Cr, Fe, Co, Ni, Cu, Zn, Pd, and Pt, including mixtures of two or more thereof;

wherein preferably the one or more transition metal elements M are selected from the group consisting of Fe, Cu, Pd, and Pt, including mixtures of two or more thereof, more preferably from the group consisting of Fe, Cu, and Pd, including mixtures of two or more thereof, wherein more preferably the zeolitic material obtained in (1b), (1c), (1d), or (1e) is subject to one or more ion exchange procedures with Fe and/or Cu, preferably with Cu.

44. The process of embodiment 43, wherein the one or more transition metal elements M are in the oxidation state +2.

45. A rare earth element containing zeolitic material as obtainable and/or obtained according to the process of any one of embodiments 18 to 44.

46. Use of the rare earth element containing zeolitic material according to any one of embodiments 1 to 17 and 45 as a molecular sieve, as an adsorbent, for ion-exchange, as a catalyst or a precursor thereof, and/or as a catalyst support or a precursor thereof, preferably as a catalyst or a precursor thereof and/or as a catalyst support or a precursor thereof, more preferably as a catalyst or a precursor thereof, more preferably as a catalyst for the selective catalytic reduction (SCR) of nitrogen oxides $NO_R$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_R$, and more preferably for the selective catalytic reduction (SCR) of nitrogen oxides NO, in exhaust gas from a combustion engine, preferably from a diesel engine or from a lean burn gasoline engine.

EXAMPLES

Catalyst Characterization

Figure 1:
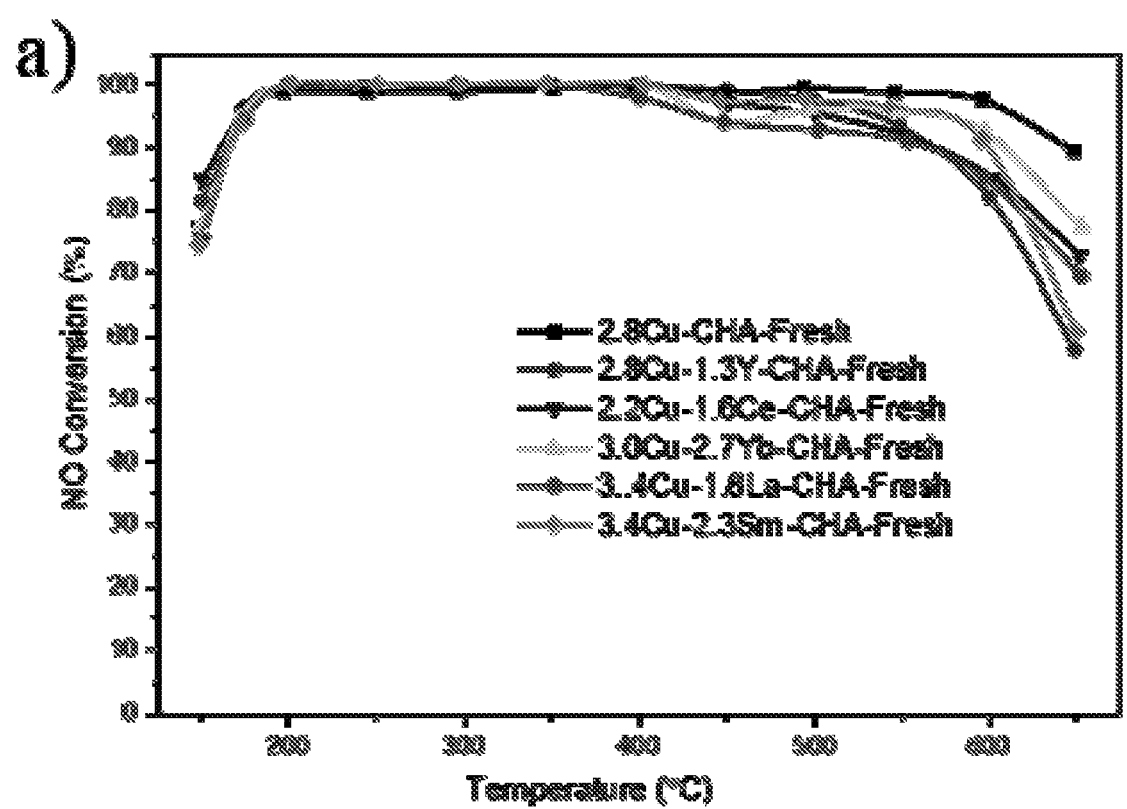
FIG. 1 shows the NO conversions obtained according to Example 3 as a function of temperature on the rare-earth ion exchanged Cu-SSZ-13 samples obtained from Example 1 and on Cu-SSZ-13 from Comparative Example 1 in the fresh state, respectively. In the figure, the NO conversion in % is plotted along the ordinate and the temperature in ° C. is plotted along the abscissa. The results for Cu-SSZ-13 with 2.8 wt.-% of Cu is indicated by "■", for Cu,La-SSZ-13 with 3.4 wt.-% of Cu is indicated by "●", for Cu,Sm-SSZ-13 with 2.3 wt.-% of Cu is indicated by "♦", for Cu,Ce-SSZ-13 with 1.6 wt.-% of Cu is indicated by "▼", for Cu,Yb-SSZ-13 with 2.7 wt.-% of Cu is indicated by "▲", for and Cu,Y-SSZ-13 with 2.8 wt.-% of Cu is indicated by "•".

The cation contents in the catalysts were determined by Inductively Coupled Plasma Atomic Emission Spectroscopy (ICP-AES, Optima 2000 DV, USA).

Example 1: Preparation of Rare Earth Element Containing Al-Rich Zeolitic Materials Having the CHA Framework Structure Loaded with Copper Al-rich Na-SSZ-13 zeolite (Si/Al=4) was synthesized from an organotemplate-free approach according to the method disclosed in the examples of WO 2013/068976 A. The Al-rich Na-SSZ-13 was then ion-exchanged twice with 0.1 M $NH_4NO_3$ at 80° C. to obtain $NH_4$—SSZ-13. $NH_4$-SSZ-13 was then exchanged with 0.0015 M rare-earth nitrate solution (La, Sm, Ce, Yb, Y) (pH=3.5) at 130° C. for 12 h. Thereafter, the zeolite slurries were filtered, washed with deionized water and dried at 110° C. for 2 h to obtain SSZ-13 with 1.8 wt.-% of La, SSZ-13 with 2.3 wt.-% of Sm, SSZ-13 with 1.6 wt.-% of Ce, SSZ-13 with 2.7 wt.-% of Yb, and SSZ-13 with 1.3 wt.-% of Y, respectively.

The samples were then ion exchanged with copper. To this effect, copper ions were introduced at about 2.8 wt.-% loading by the ion-exchange of rare earth metal containing SSZ-13 samples using aqueous solution of $Cu(NO)_3$ (pH=3.0) with different concentrations ranging from 0.009 to 0.02 M at 80° C. for 4 h. Thereafter, the zeolite slurries were filtered, washed with deionized water and dried at 110° C. overnight. Subsequently, the samples were calcined in muffle oven at 550° C. for 5 h with a ramping rate of 2° C./min, thus obtaining La-SSZ-13 with 3.4 wt.-% of Cu, Sm-SSZ-13 with 2.3 wt.-% of Cu, Ce-SSZ-13 with 1.6 wt.-% of Cu, Yb-SSZ-13 with 2.7 wt.-% of Cu, and Y-SSZ-13 with 2.8 wt.-% of Cu, respectively.

Example 2: Preparation of Yttrium Containing Al-Rich Zeolitic Materials Having the CHA Framework Structure with Different Loadings of Yttrium In order to vary the Y content, $NH_4$—SSZ-13 was exchanged with $Y(NO_3)_3$ aqueous solutions displaying concentrations of yttrium ranging from 0.00075 to 0.01 M at 130° C. for 12 h respectively, for obtaining SSZ-13 displaying loadings of yttrium of 0.8 wt.-%, 1.3 wt.-%, 2.3 wt.-%, and 2.9 wt.-%, respectively.

The samples were then ion exchanged with copper according to the procedure described in Example 1, thus obtaining SSZ-13 with 0.8 wt.-% of Y and 2.8 wt.-% of Cu, SSZ-13 with 1.3 wt. % of Y and 2.8 wt.-% of Cu, SSZ-13 with 2.3 wt.-% of Y and 2.5 wt.-% of Cu, and SSZ-13 with 2.9 wt.-% of Y and 2.2 wt.-% of Cu, respectively.

Comparative Example 1: Preparation of an Al-Rich Zeolitic Material Having the CHA Framework Structure Loaded with Copper For comparison, an Al-rich Na-SSZ-13 zeolite was synthesized and successively ion exchanged with ammonium and copper according to the procedure in Example 1, yet was not loaded with a rare earth element prior to loading with copper for obtaining SSZ-13 with 2.8 wt.-% of copper.

Comparative Example 2: Preparation of a Commercial Zeolitic Material Having the CHA Framework Structure Loaded with Copper For comparison, a conventional commercial Na-SSZ-13 zeolite as obtained from orgaotemplate synthesis (Si/Al=15, BASF, Germany) was successively ion exchanged with ammonium and copper according to the procedure in Example 1, yet was not loaded with a rare earth element prior to loading with copper for obtaining SSZ-13 with 2.5 wt.-% of copper.

Example 3: Catalyst Testing in the Selective Catalytic Reduction of $NO_x$ $NH_3$-SCR activity measurements were carried out in a fixed-bed quartz reactor (i.d. 5 mm) with the reactant gas mixture containing 500 ppm NO, 500 ppm $NH_3$, 10% $O_2$, 5% $H_2O$, and balance $N_2$. The total flow rate was 240 ml/min, corresponding to a gas hourly space velocity (GHSV) of 80,000 $h^{-1}$. NO, $NO_2$, and $N_2O$ contents were monitored continuously using a chemiluminescence analyzer (ECO Physics CLD60, Switzerland) and an infrared absorption spectrometer (Sick Maihak S710, Germany). To avoid errors caused by the conversion of ammonia in the analyzer, an ammonia trap containing phosphoric acid solution was installed upstream. All data were obtained when the SCR reaction reached the steady state at each temperature.

In the tests, catalyst samples were tested in the fresh and aged states. For aging, the Cu-RE-SSZ-13 catalysts were aged in 10% $H_2O$/Air at 800° C. for 16 h.

Figure 2:
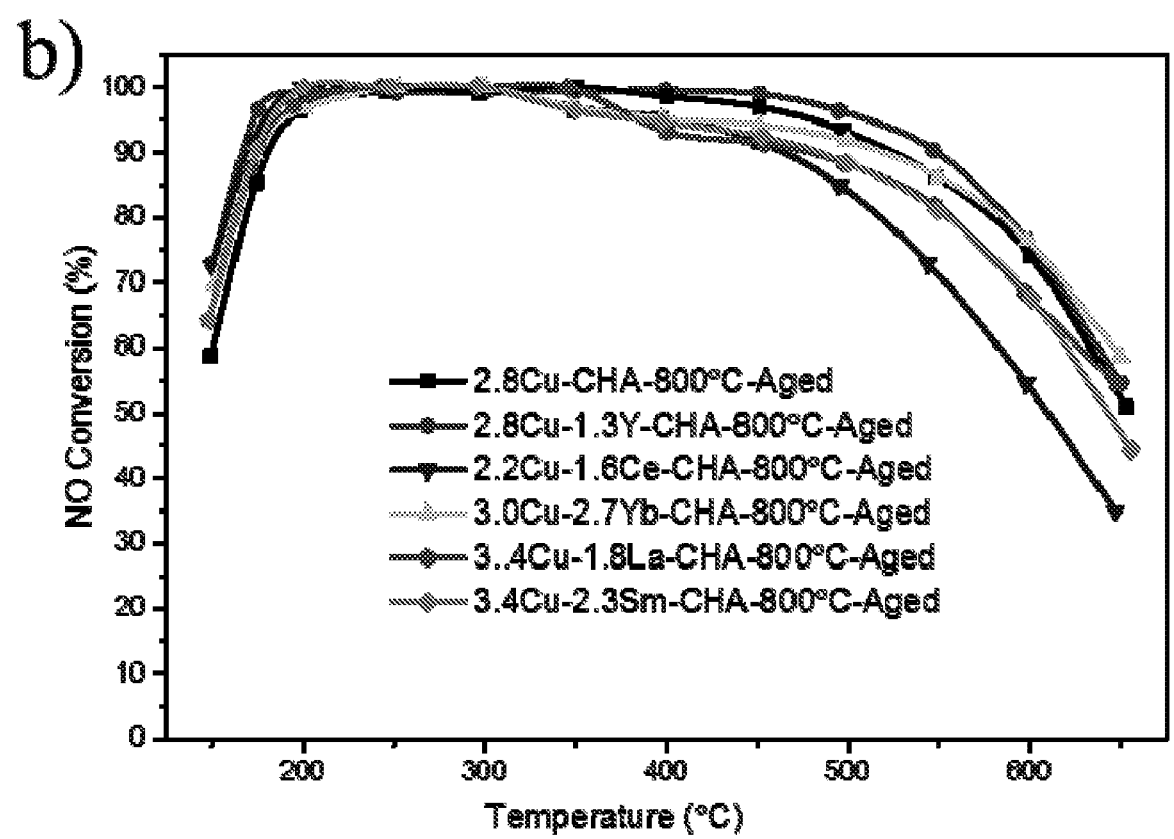
FIG. 2 shows the NO conversions obtained according to Example 3 as a function of temperature on the rare-earth ion exchanged Cu-SSZ-13 samples obtained from Example 1 and on Cu-SSZ-13 from Comparative Example 1 after hydrothermal aging of the samples, respectively. In the figure, the NO conversion in % is plotted along the ordinate and the temperature in ° C. is plotted along the abscissa. The results for Cu-SSZ-13 with 2.8 wt.-% of Cu is indicated by "■", for Cu,La-SSZ-13 with 3.4 wt.-% of Cu is indicated by "●", for Cu,Sm-SSZ-13 with 2.3 wt.-% of Cu is indicated by "♦", for Cu,Ce-SSZ-13 with 1.6 wt.-% of Cu is indicated by "▼", for Cu,Yb-SSZ-13 with 2.7 wt.-% of Cu is indicated by "▲", for and Cu,Y-SSZ-13 with 2.8 wt.-% of Cu is indicated by "•".
Figure 3:
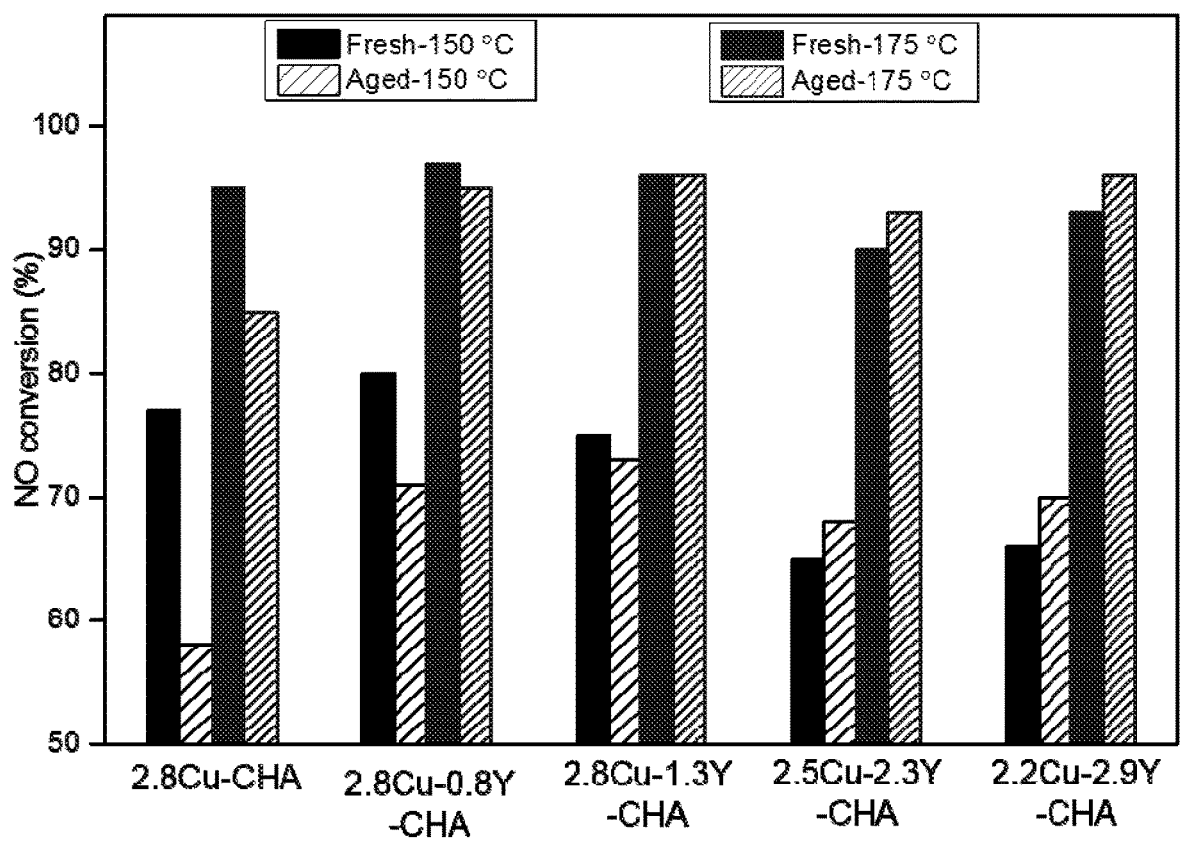
FIG. 3 shows the low-temperature (150° C. to the right and 175° C. to the left for each sample, respectively) NO conversions obtained according to Example 3 on fresh and hydrothermally aged Al-rich Cu—Y-SSZ-13 catalysts with different amounts of Y as obtained according to Example 2 and Cu-SSZ-13 from Comparative Example 1, respectively. In the figure, the NO conversion in % is plotted along the ordinate. The results are displayed for Cu-SSZ-13 with 2.8 wt.-% of Cu indicated by "2.8Cu-CHA", Cu,Y-SSZ-13 with 0.8 wt.-% of Y and 2.8 wt.-% of Cu indicated by "2.8Cu-0.8Y-CHA", Cu,YSSZ-13 with 1.3 wt.-% of Y and 2.8 wt.-% of Cu indicated by "2.8Cu-1.3Y-CHA", Cu,Y-SSZ-13 with 2.3 wt.-% of Y and 2.5 wt.-% of Cu indicated by "2.8Cu-2.3Y-CHA", and Cu,Y-SSZ-13 with 2.9 wt.-% of Y and 2.2 wt.-% of Cu indicated by "2.8Cu-2.9Y-CHA", respectively.
Figure 4:
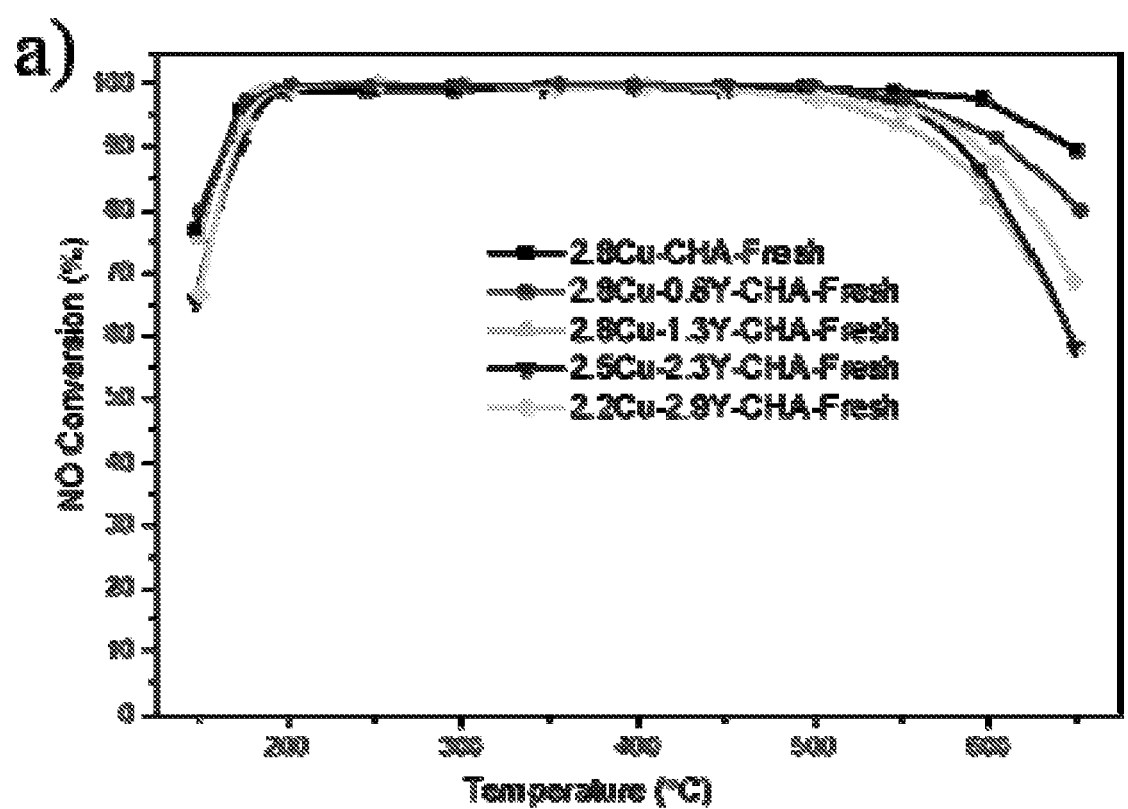
FIG. 4 shows the NO conversions obtained according to Example 3 as a function of temperature on the rare-earth ion exchanged Cu-SSZ-13 samples obtained from Example 2 and on Cu-SSZ-13 from Comparative Example 1 in the fresh state, respectively. In the figure, the NO conversion in % is plotted along the ordinate and the temperature in ° C. is plotted along the abscissa. The results for Cu-SSZ-13 with 2.8 wt.-% of Cu is indicated by "■", for Cu,Y-SSZ-13 with 2.9 wt.-% of Y and 2.2 wt.-% of Cu is indicated by "◆", for Cu,Y-SSZ-13 with 2.3 wt.-% of Y and 2.5 wt.-% of Cu is indicated by "▼", for Cu,Y-SSZ-13 with 1.3 wt.-% of Y and 2.8 wt.-% of Cu is indicated by "▲", for and Cu,Y-SSZ-13 with 0.8 wt.-% of Y and 2.8 wt.-% of Cu is indicated by "•".
Figure 5:
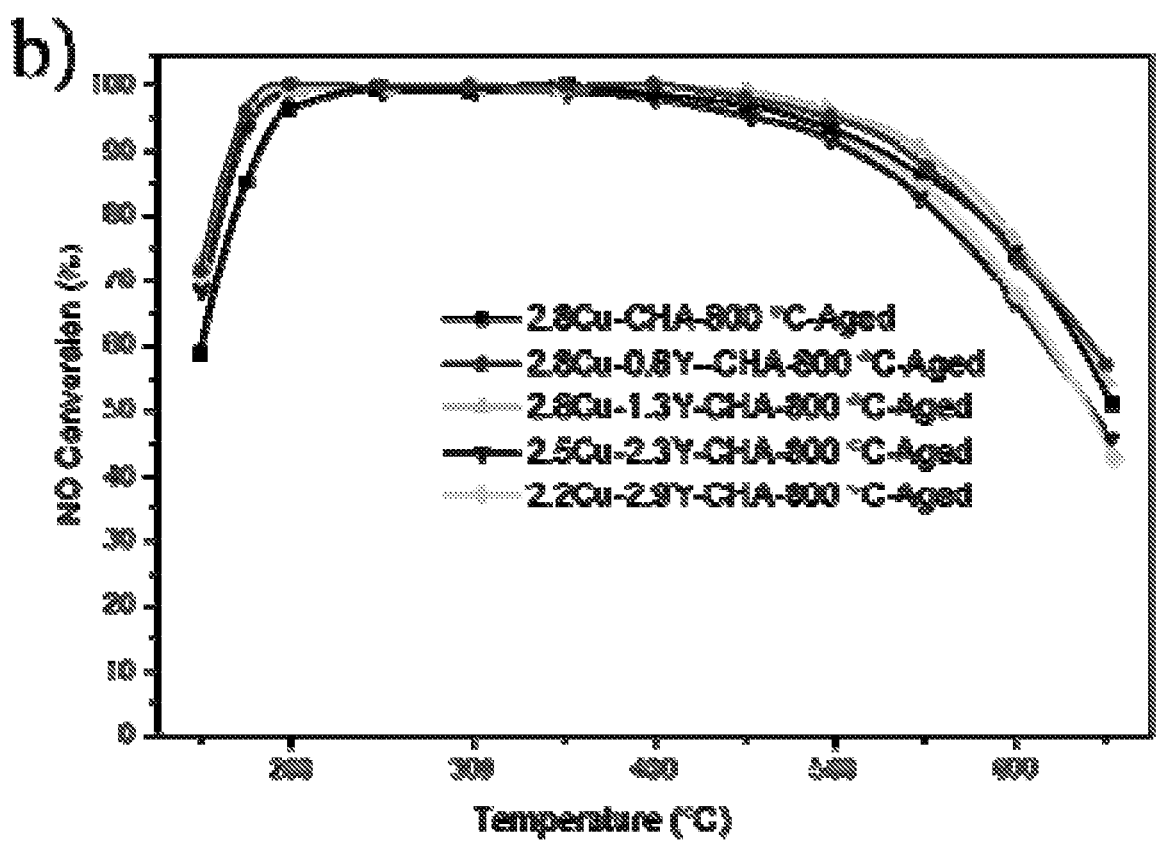
FIG. 5 shows the NO conversions obtained according to Example 3 as a function of temperature on the rare-earth ion exchanged Cu-SSZ-13 samples obtained from Example 2 and on Cu-SSZ-13 from Comparative Example 1 after hydrothermal aging of the samples, respectively. In the figure, the NO conversion in % is plotted along the ordinate and the temperature in ° C. is plotted along the abscissa. The results for Cu-SSZ-13 with 2.8 wt.-% of Cu is indicated by "■", for Cu,Y-SSZ-13 with 2.9 wt.-% of Y and 2.2 wt.-% of Cu is indicated by "◆", for Cu,Y-SSZ-13 with 2.3 wt.-% of Y and 2.5 wt.-% of Cu is indicated by "▼", for Cu,Y-SSZ-13 with 1.3 wt.-% of Y and 2.8 wt.-% of Cu is indicated by "▲", for and Cu,Y-SSZ-13 with 0.8 wt.-% of Y and 2.8 wt.-% of Cu is indicated by "•".
Figure 6:
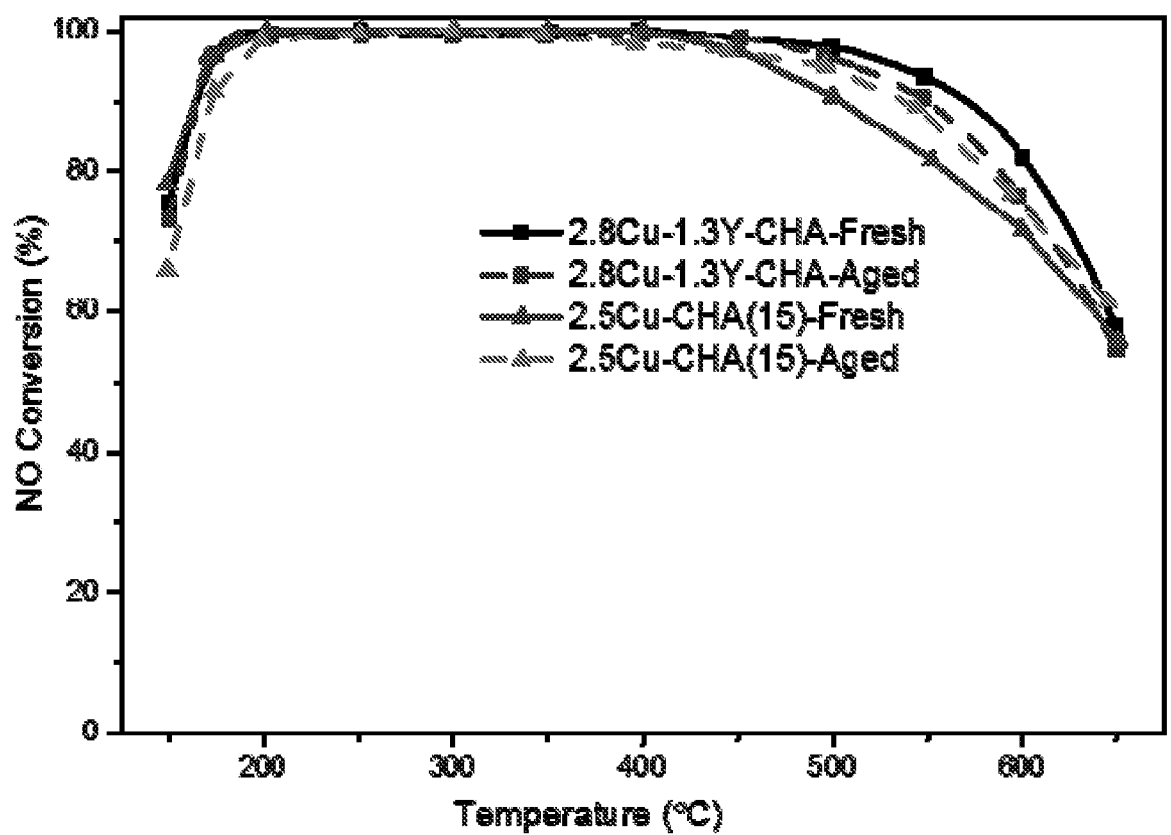
FIG. 6 shows the NO conversions obtained according to Example 3 as a function of temperature on the rare-earth ion exchanged Al-rich Cu-SSZ-13 sample obtained from Example 2 with 1.3 wt.-% of Y and 2.8 wt.-% of Cu and on Cu-SSZ-13 from Comparative Example 2 in the fresh and hydrothermally aged states, respectively. In the figure, the NO conversion in % is plotted along the ordinate and the temperature in ° C. is plotted along the abscissa. The results for Cu-SSZ-13 from Comparative Example 2 is indicated by "▲" and for Al-rich Cu,Y-SSZ-13 with 1.3 wt.-% of Y and 2.8 wt.-% of Cu is indicated by "■".

Thus, as may be taken from the results displayed in FIGS. 2, 3, and 5, it has surprisingly been found that for the inventive catalysts a superior NO conversion in SCR may be observed at low temperatures compared to a catalyst sample devoid of a rare earth metal. Furthermore, as may be taken from FIGS. 3 and 5, it has quite unexpectedly been found that for selected inventive catalysts having loadings of yttrium within a certain range, a superior NO conversion is observed in the aged catalysts at high temperatures comparted to a catalyst devoid of a rare earth metal. These findings are particularly surprising since it has been found that in fact low amounts of rare earth metals, and in particular of Y, lead to a substantially higher aging resistance than catalyst samples containing higher amounts thereof.

CITED PRIOR ART DOCUMENTS

Zhao, Z. et al., *Appl. Catal. B: Environ.* 2017, 21Z 421-428
Iwasaki, M. et al., *Chem. Commun.* 2011, 47, 3966-3968
Wang, J. et al., *Ind. Eng. Chem. Res.* 2016, 55, 1174-1182
Shu, Y. et al., *Top Catal* 2015, 58, 334-342
WO 2013/068976 A

The invention claimed is:

1. A zeolitic material, having a framework structure selected from the group consisting of AEI, AFT, AFV, AFX, AVL, CHA, EMT, GME, KFI, LEV, LTN, SFW, and mixtures of two or more thereof, the framework structure comprising $SiO_2$ and $X_2O_3$, wherein X is a trivalent element,
wherein the zeolitic material has a molar ratio of $SiO_2$ to $X_2O_3$ in a range of from 2 to 20, and
wherein the zeolitic material comprises one or more rare earth elements RE as counter-ions at ion exchange sites of the framework structure;
wherein the one or more rare earth elements RE are selected from the group consisting of La, Pr, Nd, Sm, Eu, Gd, Tb, Dy, Ho, Er, Tm, Yb, Lu, Y, Sc, and combinations of two or more thereof.

2. The zeolitic material of claim 1, wherein X is selected from the group consisting of Al, B, In, Ga, and combinations of two or more thereof.

3. The zeolitic material of claim 1, wherein an effective ionic radius of the one or more rare earth elements RE is 1.3 angstroms or less.

4. The zeolitic material of claim 1, wherein the one or more rare earth elements RE are comprised in the zeolitic material in an amount in a range of from 0.1 to 7 wt.-% based on 100 wt.-% of $SiO_2$ comprised in the zeolitic material.

5. The zeolitic material of claim 1, wherein a molar ratio, RE:$X_2O_3$, of the one or more rare earth elements RE calculated as the respective elements to X2O3 comprised in the zeolitic material is in a range of from 0.01 to 0.3.

6. The zeolitic material of claim 1, wherein the zeolitic material further comprises one or more transition metal elements M selected from the group consisting of Cr, Fe, Co, Ni, Cu, Zn, Pd, Pt, and combinations of two or more thereof, as counter-ions at ion exchange sites of the framework structure.

7. The zeolitic material of claim 6, wherein the one or more transition metal elements M are comprised in the zeolitic material in an amount in a range of from 0.5 to 10 wt.-% based on 100 wt.-% of $SiO_2$ comprised in the zeolitic material.

8. The zeolitic material of claim 6, wherein a molar ratio, M:$X_2O_3$, of the one or more transition metal elements M calculated as the respective elements to $X_2O_3$ contained in the zeolitic material is in a range of from 0.01 to 1.5.

9. The zeolitic material of claim 1, wherein the framework structure comprises a CHA-type framework structure and the zeolitic material comprises one or more selected from the group consisting of (Ni(deta)$_2$)-UT-6, Chabazite, |Li-Na||Al-Si-O]-CHA, DAF-5, LZ-218, Linde D, Linde R, MeAPSO-47, Phi, SAPO-34, SAPO-47, SSZ-13, SSZ-62, UiO-21, Willhendersonite, ZK-14, ZYT-6, and mixtures of two or more thereof.

10. The zeolitic material of claim 1, wherein the zeolitic material is prepared by an organotemplate-free synthetic procedure.

11. The zeolitic material of claim 1, wherein the zeolitic material comprises one or more selected from the group consisting of SSZ-39, SAPO-18, SIZ-8, and mixtures of two or more thereof.

12. The zeolitic material of claim 1, wherein the zeolitic material is in a form chosen from a molecular sieve, an adsorbent, a catalyst or a precursor thereof, and/or a catalyst support or a precursor thereof.

13. A process of producing a zeolitic material having a framework structure selected from the group consisting of AEI, AFT, AFV, AFX, AVL, CHA, EMT, GME, KFI, LEV, LTN, SFW, and mixtures of two or more thereof, the framework structure comprising $SiO_2$ and $X_2O_3$, wherein X is a trivalent element, the process comprising:
(1) providing a zeolitic material having a framework structure selected from the group consisting of AEI, AFT, AFV, AFX, AVL, CHA, EMT, GME, KFI, LEV, LTN, SFW, and mixtures of two or more thereof, the framework structure comprising $SiO_2$ and $X_2O_3$ and the zeolitic material having a molar ratio of $SiO_2$ to $X_2O_3$ in a range of from 2 to 20;
(2) optionally subjecting the zeolitic material provided in (1) to one or more ion exchange procedures with H+ and/or $NH_4^+$; and
(3) subjecting the zeolitic material provided in (1) or obtained in (2) to one or more ion exchange procedures with one or more rare earth elements;
wherein the one or more rare earth elements RE are selected from the group consisting of La, Pr, Nd, Sm, Eu, Gd, Tb, Dy, Ho, Er, Tm, Yb, Lu, Y, Sc, and combinations of two or more thereof.

14. A zeolitic material, prepared according to the process of claim 13.

\* \* \* \* \*

UNITED STATES PATENT AND TRADEMARK OFFICE
CERTIFICATE OF CORRECTION

PATENT NO. : 11,219,886 B2
APPLICATION NO. : 17/047239
DATED : January 11, 2022
INVENTOR(S) : Andrei-Nicolae Parvulescu et al.

Page 1 of 1

It is certified that error appears in the above-identified patent and that said Letters Patent is hereby corrected as shown below:

In the Claims

Claim 5, Column 24, Line 8, "X203" should read as --$X_2O_3$--.

Claim 8, Column 24, Line 30, "|Li-Na1|[Al-Si-I]-CHA," should read as --|Li-Na|[Al-Si-I]-CHA,--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*